United States Patent
Kakehi

(10) Patent No.: US 8,018,216 B2
(45) Date of Patent: Sep. 13, 2011

(54) POWER SUPPLY VOLTAGE BOOSTER

(75) Inventor: Tatsuya Kakehi, Anjo (JP)

(73) Assignee: Denso Corporation, Kariya (JP)

( * ) Notice: Subject to any disclaimer, the term of this patent is extended or adjusted under 35 U.S.C. 154(b) by 546 days.

(21) Appl. No.: 12/170,780

(22) Filed: Jul. 10, 2008

(65) Prior Publication Data

US 2009/0015223 A1  Jan. 15, 2009

(30) Foreign Application Priority Data

Jul. 13, 2007 (JP) ................................. 2007-184685

(51) Int. Cl.
G05F 1/575 (2006.01)
G05F 1/59 (2006.01)

(52) U.S. Cl. ......... 323/288; 323/266; 323/284; 323/285

(58) Field of Classification Search ............... 363/20, 363/21.01, 21.11, 21.1, 21.07, 21.08, 21.05, 363/21.04; 323/222, 225, 266, 271, 282, 323/284, 285, 288
See application file for complete search history.

(56) References Cited

U.S. PATENT DOCUMENTS

| | | | |
|---|---|---|---|
| 6,407,593 B1 | 6/2002 | Kawamoto et al. | |
| 6,571,773 B1 | 6/2003 | Yamakado et al. | |
| 6,766,789 B2 * | 7/2004 | Yamakado et al. | 123/490 |
| 6,768,350 B1 * | 7/2004 | Dickey | 327/108 |
| 7,299,789 B2 * | 11/2007 | Vierling et al. | 123/490 |
| 7,812,503 B2 * | 10/2010 | Kakehi et al. | 310/317 |

FOREIGN PATENT DOCUMENTS

| | | |
|---|---|---|
| JP | 09-065652 | 3/1997 |
| JP | 11-210531 | 8/1999 |
| JP | 2002-295293 | 10/2002 |
| JP | 2003-222061 | 8/2003 |

OTHER PUBLICATIONS

Japanese Office Action dated Feb. 17, 2009, issued in corresponding Japanese Application No. 2007-184685, with English translation.
Japanese Office Action dated Feb. 17, 2009, issued in corresponding Japanese Application No. 2007-184685, with English translation.

* cited by examiner

Primary Examiner — Gary L Laxton
Assistant Examiner — Nusrat Quddus
(74) Attorney, Agent, or Firm — Nixon & Vanderhye P.C.

(57) ABSTRACT

A power supply voltage booster avoids inadequate step-up capability. In a voltage boosting circuit, a switching device connects and disconnects between the ground potential and one end of the coil, the other end of which is supplied with a supply voltage VB. The switching device is repeatedly turned ON and OFF such that the capacitor is electrically charged from the force in the coil when the switching device is turned off. A charging control circuit turns off the switching device when current flowing through the switching device into the coil is determined to have increased to a switch-off threshold value when the switching device is ON, and turns on the switching device upon determining that the charging current flowing to the capacitor from the coil decreases to a switch-on threshold value when the switching device is OFF. The charging control circuit sets the switch-off threshold value to a larger value as the supply voltage VB is lower. Thus, inadequacy of the step-up capability caused by a drop in the supply voltage VB can be avoided.

8 Claims, 25 Drawing Sheets

——— SUPPLY VOLTAGE = 14V
—··—··— SUPPLY VOLTAGE = 8V

—— SUPPLY VOLTAGE = 14V
—·—·— SUPPLY VOLTAGE = 8V

——— SUPPLY VOLTAGE = 14V
—··—··— SUPPLY VOLTAGE = 8V

→ TIME

→ TIME

——— SUPPLY VOLTAGE = 14V
—··—··— SUPPLY VOLTAGE = 8V

POWER SUPPLY VOLTAGE BOOSTER

CROSS REFERENCE TO RELATED APPLICATIONS

The present application is based on and claims priority to Japanese Patent Application No. 2007-184685, filed Jul. 13, 2007, the entire contents of which are incorporated herein by reference.

BACKGROUND OF THE INVENTION

1. Field of the Invention

The present invention is related to a power supply voltage booster that boosts a power supply voltage to produce a voltage higher, and, more particularly, to a power supply voltage booster used in a fuel injection controller.

2. Description of the Related Art

A conventional voltage boosting circuit that charges a capacitor to a boosted voltage higher than a battery voltage is provided in a fuel injection controller. A fuel injection valve is operated by the controller based on, for example, a built-in solenoid that controls fuel injection in an internal combustion engine. At the start of the operation of a solenoid operated fuel injection valve, the controller executes an operation to supply a large current, such as the peak current induced by the boosted voltage, from the capacitor to an electromagnetic coil of the solenoid built in the fuel injection valve in order to immediately open the fuel injection valve. Then, the fuel injection controller executes an operation to provide a constant current supply such as a holding current for holding the valve open. The current is supplied from a constant current circuit to the electromagnetic coil in order to hold the open position of the fuel injection valve. To provide rapid opening response of the fuel injection valve, the battery voltage serving as the power supply voltage is boosted, thereby accumulating electrical energy in the capacitor. The accumulated energy is discharged from the capacitor so as to cause a large current to flow to the fuel injection valve, resulting in increased speed of the opening operation of the fuel injection valve.

The voltage boosting circuit used in such a fuel injection controller is of a DC-DC converter type equipped with a coil having one end to which a battery voltage is applied, and a switching device that is turned on and off for electrical connection and disconnection between the other end of the coil and the ground potential of zero volts serving as a reference electrical potential. The switching device is repeatedly turned on and off such that the capacitor is electrically charged from the counter-electromotive force of the coil when the switching device is turned off. A description of such a voltage boosting circuit is found in JP-2001-15332A.

FIG. 28A illustrates an example, of a voltage boosting circuit using an N-channel metal oxide semiconductor field effect transistor (MOSFET) as a switching device. In the voltage boosting circuit, a battery voltage VB is applied to one end of the coil L0. Two output terminals of the switching device T0—a drain and a source—are connected in series to the path between the other end of the coil L0 and the ground potential. The anode of a diode D0 is connected to the current path between the other end of the coil L0 and the drain of the switching device T0, which is closer to the coil L0. A charging capacitor C0 is connected in series to the path between the cathode of the diode D0 and the ground potential. In the present example, the ground potential is connected through a current detection resistor R0 to the source of the switching device T0, which is farther away from the coil L0, and the terminal of the capacitor C0, which is farther away from the diode D0.

As shown in FIG. 28B, when the switching device T0 is turned on in the voltage boosting circuit, the current is passed to the coil L0 through the switching device T0 and the resistor R0. When the switching device is switched from ON to OFF, the capacitor C0 is electrically charged through the diode D0 by a counter-electromotive force which occurs in the coil L0, the counter-electromotive force having a high voltage from several times to several tens times as high as the battery voltage VB. In this manner, the capacitor C0 is charged whenever the switching device T0 is repeatedly turned on and off. The diode D0 prevents a flow of current to the switching device T0 from the capacitor C0 that would result in a discharge of the capacitor C0.

In the voltage boosting circuit, a charging control circuit 10 turns on and drives the switching device T0 at the start of the switching control for boosting the voltage. Then, as shown, the charging control circuit 10 detects the current flowing through the switching device T0 and applied to the coil L0 as a result of the voltage produced across the resistor R0. Upon determining that the detected current increases to a predetermined switch-off threshold value Ioff, the charging control circuit 10 switches the switching device T0 from OFF to ON. The charging control circuit 10 detects the capacitor charging current flowing from the coil L0 into the capacitor C0 as a result of the voltage produced across the resistor R0 when the switching device T0 is turned off. Upon determining that the detected current is reduced to a predetermined switch-on threshold value Ion of approximately zero amperes in the present example, the charging control circuit 10 switches the switching device T0 from ON to OFF.

By repeating the above described operation of repeatedly switching device T0 on and off, the capacitor is gradually charged. The charging control circuit 10 monitors the charging voltage VC applied to the capacitor C0, which can be referred to hereinafter as the capacitor voltage VC. When the capacitor voltage VC reaches the target value of the target voltage for the capacitor charging, the charging control circuit 10 stops the switching control for boosting the voltage, and holds the switching device T0 off.

In connection with the above described action, certain observations have been noted. First, the above described type of voltage boosting circuit depends on a supply voltage for its step-up capability, that is, for the electrical energy needed for charging the capacitor per fixed time or unit time.

Specifically, the energy En stored in the coil L0 by one operation for switching can be expressed by Equation 1 as follows:

$$En = \tfrac{1}{2} \times L \times Ioff^2 \qquad (1)$$

where L is the inductance of the coil L0.

The time T required for executing one switching operation, that is, the time T required for one operation of turning on/off the switching device T0, can be expressed by Equation 2 as follows:

$$T = L \times Ioff / VB \qquad (2)$$

Typically, the OFF time Toff of the switching device T0 is significantly shorter than the ON time Ton as shown in FIG. 28B, so that Toff is approximately equal to zero and T is approximately equal to Ton. Further, the time constant τ of the LR circuit constituted of the coil L0 and the resistance component when the switching device T0 is turned on is analogous to T=Ton.

It is seen from Equation 1 and Equation 2 that the step-up capability, that is, En/T, is expressed by Equation 3 as follows and is dependent on the battery voltage VB serving as the supply voltage.

$$En/T = \tfrac{1}{2} \times Ioff \times VB \qquad (3)$$

In the related art, as shown, for example, in FIG. 29, when the power supply voltage becomes lower, it is impossible to boost the capacitor voltage VC to a target value required for driving the fuel injection valve during the period between the time when electrical energy has been discharged from the capacitor C0 for fuel injection and the time when the next fuel injection is started. In short, the step-up capability is inadequate, possibly resulting in the inaccurate operation of the fuel injection valve. The same thing may possibly occur when the time interval between injections becomes shorter, that is, when the fuel injection valve is operated at shorter time intervals or when electrical energy is discharged from the capacitor C0 at shorter time intervals.

SUMMARY OF THE INVENTION

It is therefore an object of the invention to provide a power supply voltage booster capable of avoiding inadequacy of a step-up capability during operation caused by a drop in the power supply voltage or the shortening of the driving time interval of the actuator.

In accordance with various embodiments, a power supply voltage booster is provided that includes a coil having one end supplied with a power supply voltage, a switching device including two output terminals connected in series to a path between the other end of the coil and a reference electrical potential lower than the power supply voltage, a diode including an anode connected to a current path making a connection between the other end of the coil and one of the output terminals of the switching device located closer to the coil, a capacitor connected in series to a path between a cathode of the diode and the reference electrical potential, and control means. The control means performs a voltage-boost switching control operation for repeatedly switching the switching device between an ON position and an OFF position to produce a counter-electromotive force in the coil, and charges the capacitor with the counter-electromotive force so that a voltage higher than the power supply voltage is produced in a terminal of the capacitor farther away from the reference electric potential.

In a power supply voltage booster according to a first aspect, the control means changes a control condition for the voltage-boost switching control to increase the amount of energy charged to the capacitor per fixed time when the power supply voltage becomes low.

In a power supply voltage booster of a second aspect, the control means may detect, during the voltage-boost switching control, a current flowing through the coil when the switching device is in the ON position, and turns the switching device from the ON position to the OFF position when the control means determines that the current increases to a switch-off threshold value. In addition, the control means may change the control condition such as the switch-off threshold value, in accordance with the power supply voltage to increase the switch-off threshold value when the power supply voltage becomes low.

According to the power supply voltage booster of a second aspect, the switch-off threshold value is set to a high value when the power supply voltage drops. As can be seen from Equations 1 to 3, when the switch-off threshold value is increased, the energy stored in the coil when the switching device is in the ON position is increased. As a result, it is possible to increase the energy charged to the capacitor by the single operation of switching the switching device between the ON and OFF positions, leading to an increase in the charging energy per fixed time.

In a power supply voltage booster of a third aspect, the control means may detect, during the voltage-boost switching control, a charging current flowing into the capacitor from the coil when the switching device is in the OFF position, and turn the switching device from the OFF position to the ON position when the control means determines that the current decreases to the switch-on threshold value. In addition, the control means may change the control condition by changing the switch-on threshold value in accordance with the power supply voltage to increase the switch-on threshold value when the power supply voltage becomes low.

According to the third aspect, the switch-on threshold value is set to a high value when the power supply voltage drops. The OFF time period of the switching device is shorter than the OFF time period when the switch-on threshold value is not changed. It is thereby possible to increase the number of charging times, which are the times of switching between the ON and OFF positions per fixed time, leading to an increase in the energy charged per fixed time.

In a power supply voltage booster of a fourth aspect, the control means may change an ON time period of the switching device which is a control condition in the voltage-boost switching control in accordance with the power supply voltage to lengthen the ON time during which the power supply voltage becomes low.

According to the power supply voltage booster of a fourth aspect, the ON time period of the switching device is set longer when the power supply voltage drops. As a result, the energy stored in the coil when the switching device is in the ON position is increased. It is therefore possible to increase the energy charged to the capacitor by the single operation of switching the switching device between the ON and OFF positions, leading to an increase in the charging energy per fixed time.

In a power supply voltage booster according to a fifth aspect, the control means may change a control condition such as an OFF time of the switching device in the voltage-boost switching control in accordance with the power supply voltage to shorten the OFF time during which the power supply voltage becomes low. Accordingly, it is possible to increase the number of time the switching device is switched between the ON and OFF positions per fixed time, that is, the number of times of charging the capacitor per fixed time, leading to an increase in the energy charged per fixed time.

In a power supply voltage booster according to a sixth aspect, whenever an actuator driving time occurs, electric charge accumulated in the capacitor is discharged to the actuator as an actuator driving power. Particularly, control means detects an interval between the actuator driving times which can be referred to as the "driving time interval", and changes a control condition for the voltage-boost switching control to increase the amount of energy charged to the capacitor per fixed time when the driving time interval becomes shorter. It is possible to avoid being prevented from increasing the charging voltage of the capacitor to a target value during the period between a discharge of the capacitor for driving the actuator and the start of the next actuator driving operation.

In a power supply voltage booster according to a seventh aspect, during the voltage-boost switching control, the control means may detect a current flowing through the coil when the switching device is in the ON position, and turn the switching device from the ON position to the OFF position when the control means determines that the current increases to a switch-off threshold value. In addition, the control means may change the switch-off threshold value which is a control condition in accordance with the driving time interval to increase the switch-off threshold value when the driving time interval becomes shorter. When the driving time interval of the actuator is shortened, the switch-off threshold value is set higher. As is seen from Equations 1 to 3 described above, as the switch-off threshold value is increased, the energy stored in the coil when the switching device is in the ON position is increased. As a result, it is possible to increase the energy charged to the capacitor by the single operation of switching the switching device between the ON and OFF positions, leading to an increase in the charging energy per fixed time.

In a power supply voltage booster according to an eighth aspect, during the voltage-boost switching control, the control means may detect a charging current flowing into the capacitor from the coil when the switching device is in the OFF position, and turn the switching device from the OFF position to the ON position when the control means determines that the current decreases to a switch-on threshold value. In addition, the control means may change the switch-on threshold value which is a control condition in accordance with the driving time interval to increase the switch-on threshold value when the driving time interval becomes shorter. The switch-off threshold value is set larger when the driving time interval of the actuator becomes shorter. Accordingly, the OFF time period of the switching device is shortened, which makes it possible to increase the number of times of charging the capacitor by the number of times that the switching device is switched between the ON and OFF positions per fixed time, leading to an increase in the energy charged per fixed time.

In a power supply voltage booster of a ninth second aspect, the control means may change a control condition such as an ON time of the switching device in the voltage-boost switching control in accordance with the driving time interval to lengthen the ON time during which the driving time interval becomes shorter. When the driving time interval of the actuator is shortened, the ON time period of the switching device is set longer. Accordingly, the energy stored in the coil when the switching device is in the ON position is increased. As a result, it is possible to increase the energy charged to the capacitor by the single operation of switching the switching device between the ON and OFF positions, leading to an increase in the charging energy per fixed time.

In a power supply voltage booster of a tenth aspect, the control means may change an OFF time period of the switching device which is a control condition in the voltage-boost switching control in accordance with the driving time interval to shorten the OFF time during which the driving time interval becomes shorter. The OFF time period of the switching device is set shorter as the driving time interval of the actuator becomes shorter. Accordingly, it is possible to increase the number of times of charging the capacitor by increasing the number of times the switching device is switched between the ON and OFF positions per fixed time, leading to an increase in the energy charged per fixed time.

In a power supply voltage booster according to an eleventh aspect, whenever a driving time an actuator occurs, electric charge accumulated in the capacitor is discharged to an actuator as an actuator driving power, as in the case of the power supply voltage booster of the six aspect. Particularly, in the power supply voltage booster of the eleventh aspect, control means detects a charging voltage of the capacitor immediately before the start of the driving of the actuator which is hereinafter referred to as the "pre-drive charging voltage", and changes a control condition for the voltage-boost switching control to increase the amount of energy charged to the capacitor per fixed time when the pre-drive charging voltage becomes low. Accordingly, the reduced pre-driving charging voltage can be increased.

First, in the power supply voltage booster of the twelfth aspect, during the voltage-boost switching control, the control means may detect a current flowing through the coil when the switching device is in the ON position, and turn the switching device from the ON position to the OFF position when the control means determines that the current increases to a switch-off threshold value. In addition, the control means may change the switch-off threshold value which is a control condition in accordance with the pre-drive charging voltage to increase the switch-off threshold value when the pre-drive charging voltage becomes lower. When the pre-driving charging voltage is reduced by a drop in the power supply voltage or the shortening of the driving time interval of the actuator, the switch-off threshold value is set greater. As is seen from equations 1 to 3 described above, when the switch-off threshold value is increased, the energy stored in the coil when the switching device is in the ON position is increased, thus making it possible to increase the energy charged to the capacitor by the single operation of switching the switching device between the ON and OFF positions, leading to an increase in the charging energy per fixed time and the reduced pre-drive charging voltage can be boosted.

In a power supply voltage booster in accordance with a thirteenth aspect, during the voltage-boost switching control, the control means may detect a charging current flowing into the capacitor from the coil when the switching device is in the OFF position, and turn the switching device from the OFF position to the ON position when the control means determines that the current decreases to a switch-on threshold value. In addition, the control means may change the switch-on threshold value which is a control condition in accordance with the pre-drive charging voltage to increase the switch-on threshold value when the pre-drive charging voltage becomes lower. When the pre-drive charging voltage is reduced by a drop in the power source voltage or the shortening of the driving time interval of the actuator, the switch-on threshold value is set to a high value. Accordingly, the OFF time of the switching device is shortened, thus making it possible to increase the number of times the switching device is switched between the ON and OFF positions per fixed time, that is, the number of times of charging the capacitor per fixed time, leading to an increase in the energy charged per fixed time. As a result, the reduced pre-drive charging voltage is boosted. It is thereby possible to avoid an inadequacy in the step-up capability caused by a drop in the battery voltage or the shortening of the driving time interval of the actuator.

In a power supply voltage booster of a fourteenth aspect, the control means may change an ON time period of the switching device which is a control condition in the voltage-boost switching control in accordance with the pre-drive charging voltage to lengthen the ON time during which the pre-drive charging voltage becomes lower. When the pre-drive charging voltage is reduced by a drop in the power supply voltage or the shortening of the driving time interval of the actuator, the ON time period of the switching device is set longer. The energy stored in the coil when the switching device is in the ON position is increased, thus making it possible to increase the energy charged to the capacitor by the single operation of switching the switching device between the ON and OFF positions, leading to an increase in the charging energy per fixed time and the reduced pre-drive charging voltage can be boosted.

In a power supply voltage booster of a fifteenth aspect, the control means may change an OFF time period of the switching device in the voltage-boost switching control in accordance with the pre-drive charging voltage to shorten the OFF time during which the pre-drive charging voltage becomes lower. When the pre-drive charging voltage is reduced by a drop in the power source voltage or the shortening of the driving time interval of the actuator, the OFF time period of the switching device is set shorter. Accordingly, it is possible to increase the number of times of charging the capacitor by increasing the number of times the switching device is switched between the ON and OFF positions per fixed time leading to an increase in the energy charged per fixed time and a rise in the reduced pre-drive charging voltage.

In a power supply voltage booster according to a sixteenth aspect, electric charge accumulated in the capacitor is discharged as an actuator driving power to an actuator for opening a fuel injection valve whenever a timing of injecting fuel to an internal combustion engine occurs. Particularly, the control means determines whether or not an operation state of the internal combustion engine is in a specified operation state in which the number of times the capacitor discharges is increased. When the control means determines that the operation state is in the specified operation state, the control means changes a control condition for the voltage-boost switching control to increase the amount of energy charged to the capacitor per fixed time to a higher level than when the operation state is not the specified operation state. Accordingly, it is possible to avoid an inadequacy in step-up capability caused by an increase in the number of times the capacitor discharges, in other words, in the number of times the fuel is injected. Specifically, the charging voltage of the capacitor cannot be increased to a target value until the start of the fuel injection.

First, in a power supply voltage booster in accordance with a seventeenth aspect, during the voltage-boost switching control, the control means may detect a current flowing through the coil when the switching device is in the ON position, and turn the switching device from the ON position to the OFF position when the control means determines that the current increases to a switch-off threshold value. In addition, the control means may change the switch-off threshold value, which is a control condition, to a larger value when the operation state is determined as the specified operation state than that when the operation state is not determined as the specified operation state.

According to the power supply voltage booster of the seventeenth aspect, when the operation state of the internal combustion engine is determined as the specified operation state in which number of times the capacitor discharges is increased, the switch-off threshold value is set higher. As is seen from equations 1 to 3 described above, as the switch-off threshold value is increased, the energy stored in the coil when the switching device is in the ON position is increased. As a result, it is possible to increase the energy charged to the capacitor by the single operation of switching the switching device between the ON and OFF positions, leading to an increase in the charging energy per fixed time.

In a power supply voltage booster of an eighteenth aspect, during the voltage-boost switching control, the control means may detect a charging current flowing into the capacitor from the coil when the switching device is in the OFF position, and turn the switching device from the OFF position to the ON position when the control means determines that the current decreases to a switch-on threshold value. In addition, the control means may change the switch-on threshold value to a larger value when the operation state is determined as the specified operation state than that when the operation state is not determined as the specified operation state. The switch-off threshold value is set larger when the operation state of the internal combustion engine is determined as the specified operation state in which the number of times the capacitor discharges is increased. Accordingly, the OFF time period of the switching device is shortened making it possible to increase the number of times the switching device is switched between the ON and OFF positions per fixed time, that is, the number of times of charging the capacitor per fixed time, leading to an increase in the energy charged per fixed time.

In a power supply voltage booster of a nineteenth aspect, the control means may change a control condition such as an ON time period of the switching device in the voltage-boost switching control to a longer time period if the operation state is determined as the specified operation state as compared to if the operation state is not determined as the specified operation state. The ON time period of the switching device is set longer when the operation state of the internal combustion engine is determined as the specified operation state in which the number of times the capacitor discharges is increased. Accordingly, the energy stored in the coil is increased when the switching device is in the ON position, making it possible to increase the energy charged to the capacitor by the single operation of switching the switching device between the ON and OFF positions and leading to an increase in the charging energy per fixed time.

In a power supply voltage booster of a twentieth aspect, the control means may change an OFF time period of the switching device in the voltage-boost switching control to a shorter time period if the operation state is determined as the specified operation state as compared to if the operation state is not determined as the specified operation state. The OFF time period of the switching device becomes shorter when the operation state of the internal combustion engine is determined as the specified operation state in which the number of times the capacitor discharges is increased. Accordingly, it is possible to increase the number of times the switching device is switched between the ON and OFF positions per fixed time, that is, the number of times of charging the capacitor per fixed time, leading to an increase in the energy charged per fixed time.

BRIEF DESCRIPTION OF THE DRAWINGS

Other objects, features, and advantages will become more apparent from the following detailed description made with reference to the accompanying drawings, in which like portions are designated by like reference numbers and in which.

DETAILED DESCRIPTION OF THE EXEMPLARY EMBODIMENTS

Embodiments of an exemplary fuel injection controller will be described below with reference to the accompanying drawings. In the described embodiments, a purpose of a fuel injection controller is to drive injection valves for a internal combustion engine such as diesel engine. In particular, the various exemplary embodiments can be described in connection with four fuel injection valves for respectively injecting fuel into cylinders #1 to #4 of a four-cylinder diesel engine mounted on a vehicle. The exemplary fuel injection controller controls the time period of passing a current through a coil of a solenoid built in each of the fuel injection valves and the current application timing in order to control the amount of fuel injected into each of the cylinders #1 to #4 of the diesel engine and the fuel injection timing. The "fuel injection valve" can be referred to hereinafter as an "injector."

First Embodiment

Figure 1:
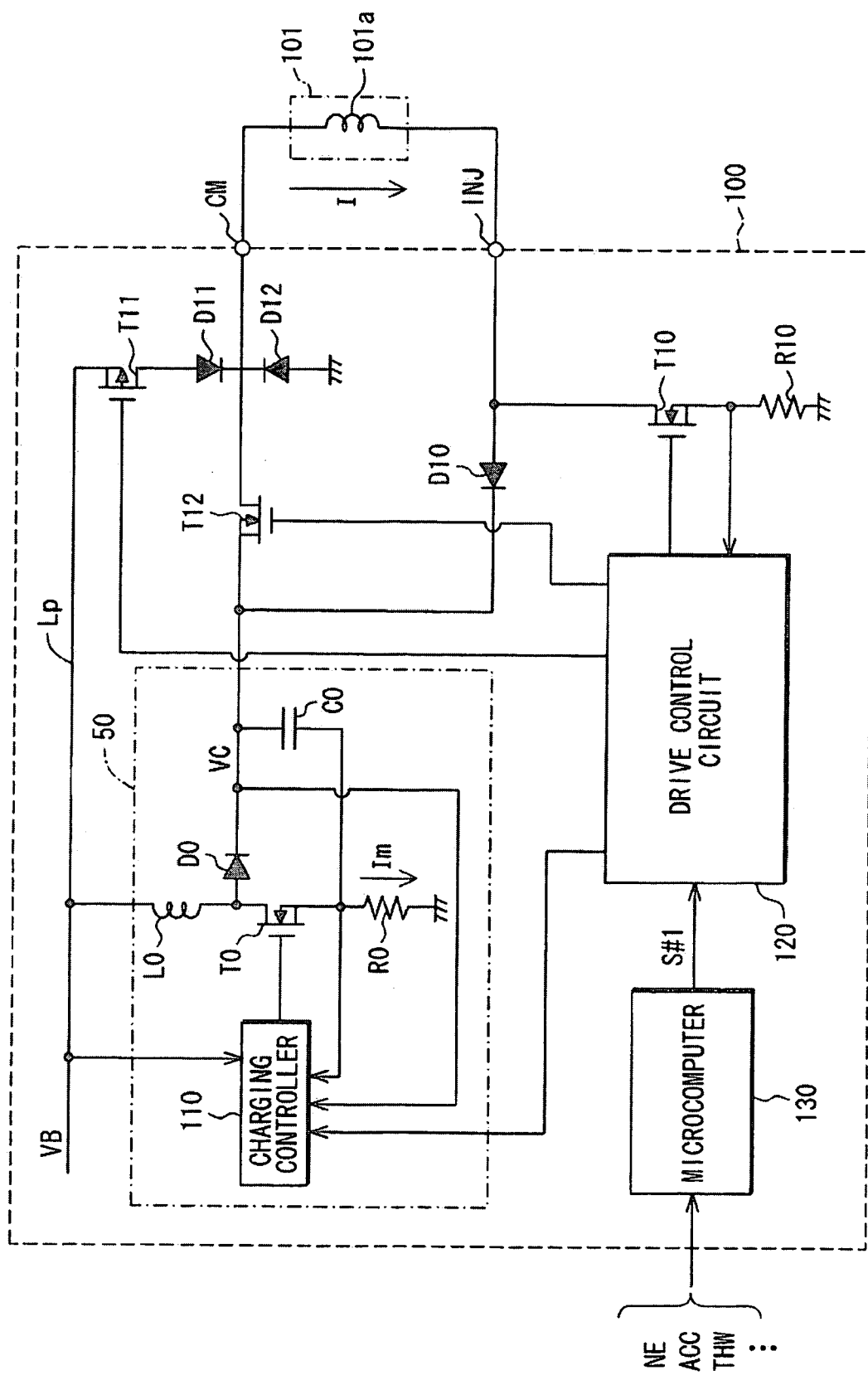
FIG. 1 is a schematic diagram illustrating a fuel injection controller according to a first embodiment.

FIG. 1 is a schematic diagram illustrating a fuel injection controller 100 of a first embodiment where an exemplary injector 101, representing one of the four injectors, and corresponding, for example, to the first cylinder #1, is shown.

The driving operation for the injector 101 shown as an example will be described below.

The injector 101 is of a known solenoid type, which includes a solenoid as a valve opening actuator. Upon application of current to a coil 101a of the solenoid built in the injector 101, the solenoid moves the valve body to the open position, so that the injector 101 is placed in the valve-open mode so as to inject fuel. Upon the ceasing of the application of current to the coil 101a, the valve body moves back to the closed position, so that the injector 101 is placed in the valve-closed mode so as to stop injecting the fuel.

Figure 28A:
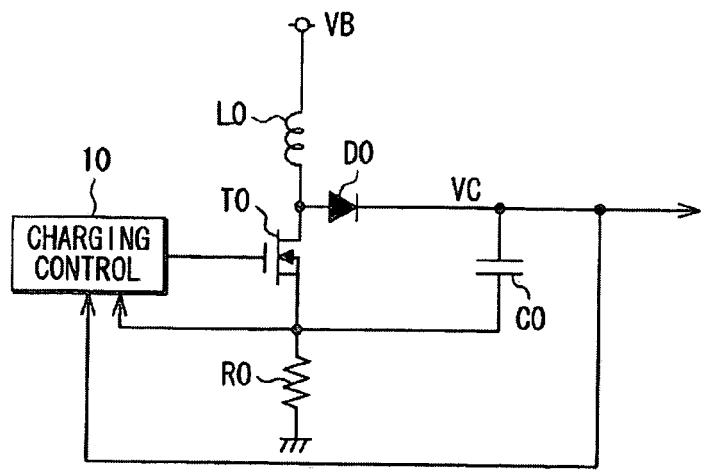
FIG. 28A is a schematic diagram illustrating a conventional voltage boosting circuit.

The fuel injection controller 100 is equipped with a voltage boosting circuit 50 having the same circuit configuration as that of the voltage boosting circuit shown in FIG. 28A. In FIG. 1 the same structural components as those shown in FIG. 28A are designated by the same reference numerals, and a description is omitted. A power supply line Lp through which a battery voltage VB of the vehicle-mounted battery is supplied as a power supply voltage. One end of the coil L0 is connected to the power supply line Lp. The voltage boosting circuit 50 has a charging control circuit 110 instead of the charging control circuit 10, which is the only point of difference from the voltage boosting circuit shown in FIG. 28A. The switching device T0 in the voltage boosting circuit 50 is hereinafter called a "step-up switch T0."

The fuel injection controller 100 is provided with a CM terminal connected to the upstream end of the coil 101a of the injector 101, an INJ terminal connected to the downstream end of the coil 101a, a transistor T10 having one output terminal connected to the INJ terminal, a resistor R10 provided for detecting the current and connected between the other output terminal of the transistor T10 and a ground line connected to a ground potential, a transistor T11, a diode D11 provided for blocking a reversed current, a transistor T12 provided for discharge, a diode D12, a diode D10, a drive control circuit 120 for controlling the transistors T10 to T12 and the voltage boosting circuit 50, and a well-known microcomputer 130 including a CPU, ROM, RAM and the like. The transistor T11 has one output terminal connected to the power supply line Lp. The diode D11 has the anode connected to the other output terminal of the transistor T11 and the cathode connected to the CM terminal. The transistor T12 connects the positive terminal of the capacitor C0 in the voltage boosting circuit 50, which is closer to the diode D0, to the CM terminal. The diode D12 has the anode connected to a ground line and the cathode connected to the CM terminal. The diode D12 feeds back the current to the coil 101a when the transistor T11 is switched from ON to OFF while the transistor T10 is in the ON position. The diode D10 has the anode connected to the INJ terminal and the cathode connected to the positive terminal of the capacitor C0. The diode D10 causes the capacitor C0 to recover a fly-back energy of the coil 101a which is generated when the transistor T10 and the transistor T11 are in the OFF position.

In the present embodiment, MOSFET is used as the transistors T10 to T12 and the step-up switch T0. The CM terminal is actually shared by the coils 101a of the injectors 101 of the respective cylinders. Accordingly, the coils 101a of the respective injectors 101 are connected to the CM terminal. The INJ terminal and the transistor T10 are individually provided for each coil 101a of the injector 101. The transistor T10 is provided for selection of the injection to be driven, and is called a cylinder selection switch.

The microcomputer 130 generates an injection command signal for each cylinder on the basis of information on the engine operation provided by various sensors. The information includes engine speed Ne, accelerator position ACC and coolant temperature THW of the engine. The microcomputer 130 sends the injection command signal to the drive control circuit 120. It is only when the signal level is high that the injection command signal indicates that the current is passed through the coil 101a and the injector 101 is opened.

The charging control circuit 110 in the voltage boosting circuit 50 includes a combination of a processing unit including a microcomputer or a logic circuit and an analog circuit. The analog circuit operates the processing unit to capture information used to control the step-up switch T0, and drives the step-up switch T0 in response to a command from the processing unit.

Figure 28B:
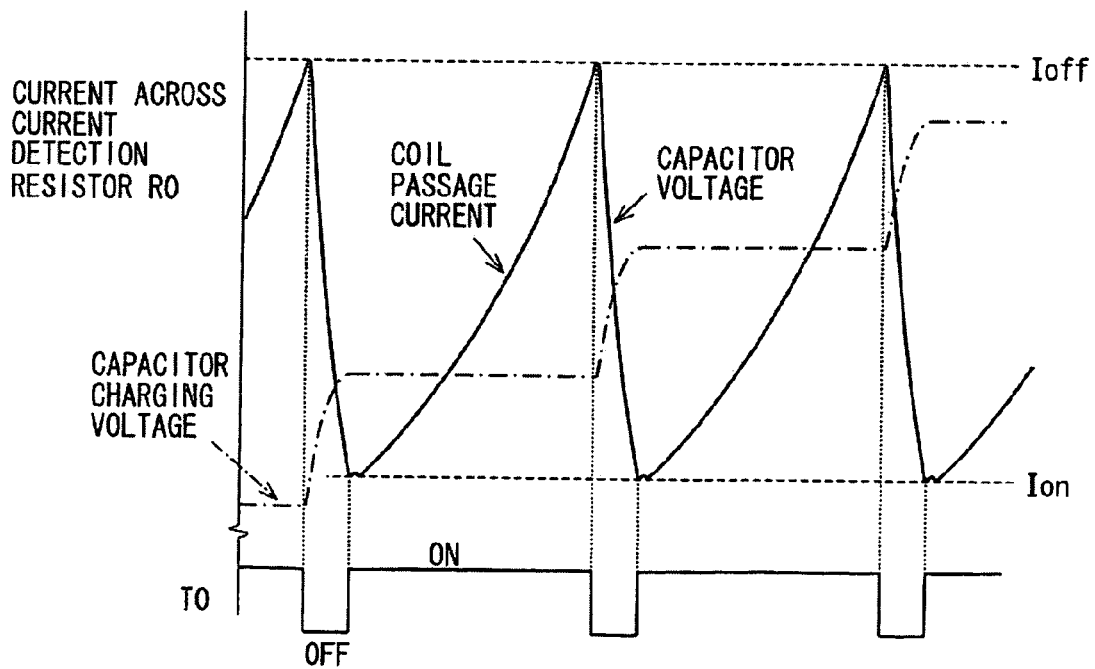
FIG. 28B is a diagram illustrating timing and signal action associated with a conventional voltage boosting circuit.

When a charge permissive signal received from the drive control circuit 120 becomes active, for example, transitions to a high level, the charging control circuit 110 starts a voltage-boost switching control similar to that performed by the aforementioned charging control circuit 10 as illustrated in FIG. 28B until the capacitor voltage VC reaches a predetermined target charging voltage.

Figure 2:
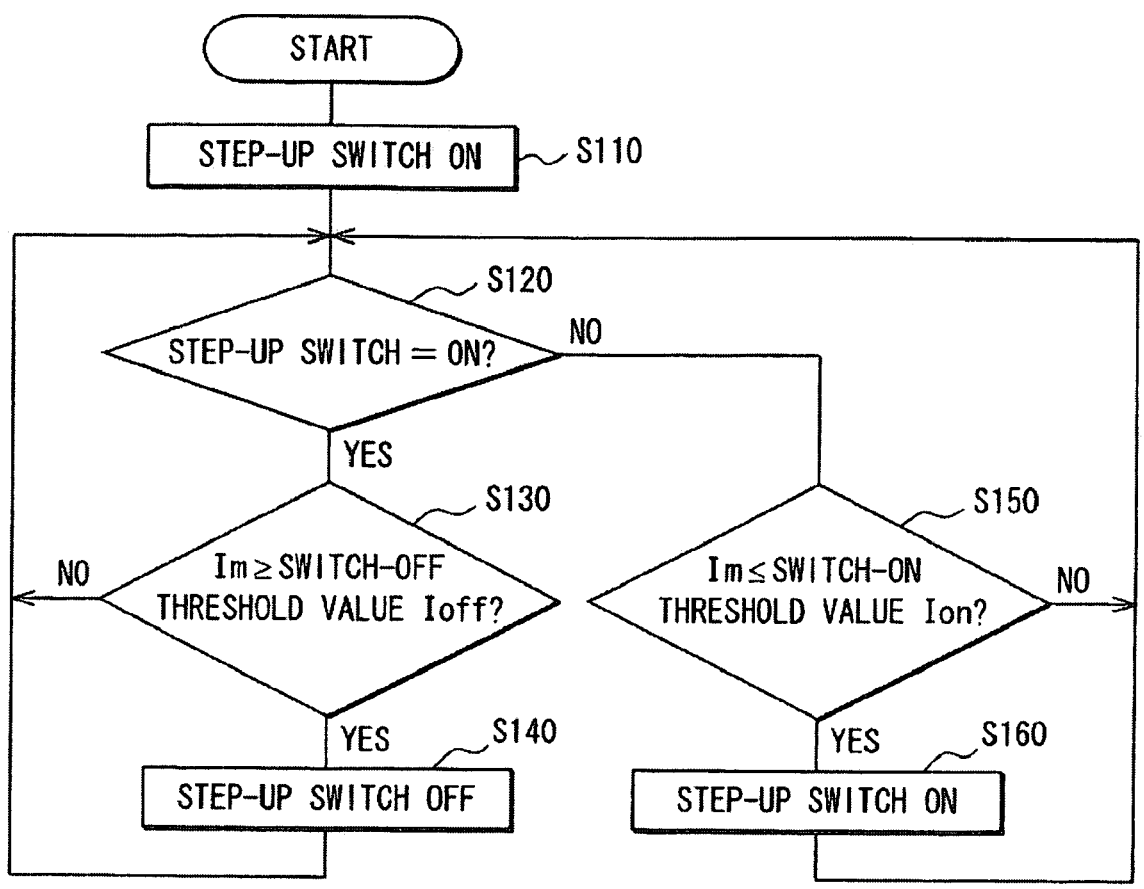
FIG. 2 is a flowchart illustrating an exemplary switching operation for boosting the voltage by a charging control circuit of a first embodiment.

As shown in FIG. 2, at the start of the voltage-boost switching control, the charging control circuit 110 turns on the step-up switch T0 at S110. Upon determining that the step-up switch T0 is turned on, corresponding to YES at S120, the charging control circuit 110 detects the current flowing into the coil L0 through the step-up switch T0 as a result of the voltage produced across the resistor R0, and waits until the current Im increases to a switch-off threshold value Ioff, corresponding to NO at S130. Then, upon determining that the current Im has increased to the switch-off threshold value Ioff, corresponding to YES at S130, the charging control circuit 110 turns off the step-up switch T0 at S140.

Upon determining that the step-up switch T0 is turned off, corresponding to NO at S120, the charging control circuit 110 detects the capacitor charging current flowing from the coil L0 into the capacitor C0 as a result of the voltage produced across the resistor R0. If the current Im has not decreased to a switch-on threshold value Ion, corresponding to NO at S150, the procedure will wait. Upon determining that the current Im has decreased to the switch-on threshold value Ion, corresponding to YES at S150, the charging control circuit 110 turns on the step-up switch T0 at S160.

By repeating the operation as described above, the charging control circuit 110 repeatedly turns the step-up switch T0 on and off so as to charge the capacitor C0 in stages. Either when the detected capacitor voltage VC reaches a target charging voltage or when the charge permissive signal received from the drive control circuit 120 becomes inactive, the charging control circuit 110 stops the voltage-boost switching control, and holds the step-up switch T0 in the OFF position.

Next, the operation of the fuel injection controller 100 with the aforementioned configuration will be described with reference to the time chart in FIG. 3. The drive control circuit 120 receives fuel-injection command signals for the respective cylinders from the microcomputer 130. The following description will focus primarily on the operation of the fuel injection controller 100 for the first cylinder #1.

Before the start of the fuel injection, the drive control circuit 120 sends an active charge permissive signal to the charging control circuit 110 in order for the voltage boosting circuit 50 to operate until the capacitor voltage VC has reached the target charge voltage.

Figure 3:
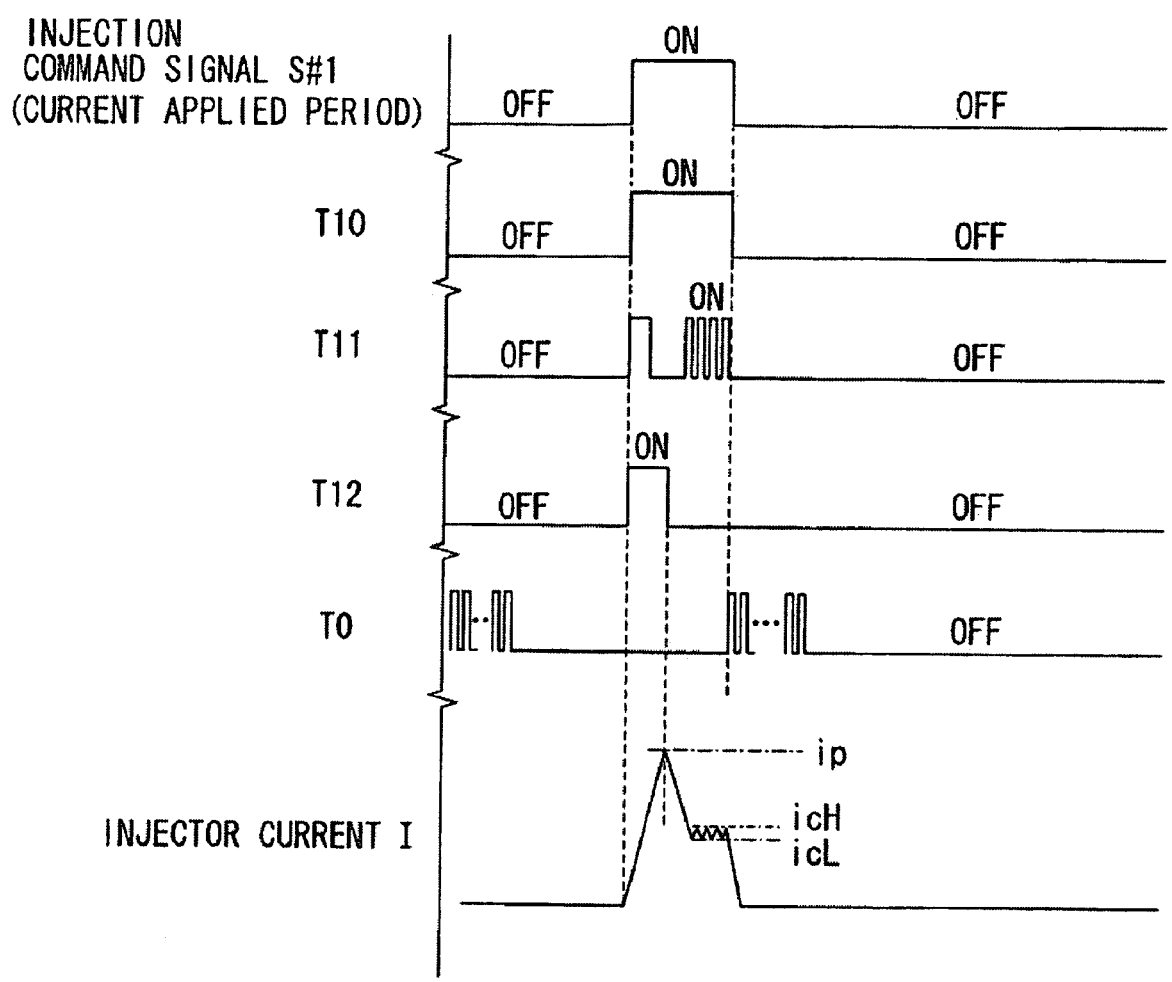
FIG. 3 is a timing diagram illustrating an operation of an exemplary fuel injection controller.

As shown in FIG. 3, when the injection command signal S#1 sent for the first cylinder #1 from the microcomputer 130 to the drive control circuit 120 changes from low to high, the drive control circuit 120 turns on the transistor T10 and simultaneously turns on the transistor T12.

Thereupon, the capacitor voltage VC is applied to the CM terminal forming part of the path through which current is applied to the coil 101a, so that the electrical energy charged in the capacitor C0 is discharged to the coil 101a. As a result, the passage of current into the coil 101a is started. A large current, such as a peak current, for promptly opening the injector 101 then flows through the coil 101a when the capacitor C0 discharges. The diode D11 prevents a flow of current toward the power supply line Lp from the CM terminal, which is raised to a high electrical potential when the electrical energy is discharged from the capacitor C0. It should be noted that the phrase "injector current I" shown in FIG. 3 refers to the electric current flowing through the coil 101a.

After the transistor T12 has been turned on, the drive control circuit 120 determines the current I flowing through the coil 101a based on the voltage produced across the resistor R10. When the current I reaches a target current value of the peak current "ip," the drive control circuit 120 turns off the transistor T12. At the start of the period in which current is applied to the coil 101a, the energy accumulated in the capacitor C0 is discharged to the coil 101a, thereby speeding up the response of the opening of the injector 101.

After the transistor T12 has been turned off, the drive control circuit 120 turns the transistor T11 on and off so that, the current I of the coil 101a, detected from the voltage produced across the resistor R10, will be a constant current lower than the aforementioned target current value "ip."

Specifically, in the constant current control for the passing of a steady current through the coil 101a while the injection command signal is high, the drive control circuit 120 turns on the transistor T11 when the current I of the coil 101a goes down to a lower threshold value "icL" or less. Similarly, the drive control circuit 120 turns off the transistor T11 when the current I of the coil 101a goes up to a higher threshold value "icH" or more. The relationship between the lower threshold value "icL", the higher threshold value "icH" and the target current value "ip" of the peak current is "icL<icH<ip."

After the current I of the coil 101a is reduced from the target current value "ip" of the peak current to the lower threshold value "icL" or less, the transistor T11 is repeatedly turned on and off so that the average value of the current I passing through the coil 101a will result in an approximately intermediate value between the higher threshold value value "icH" and the lower threshold value "icL" so as to keep the current steady.

Because of the constant current control, the transistor T11 is turned on for a short while after the injection command signal has become high as shown in the third stage in FIG. 3. The transistor T11 remains turned on until the current I of the coil 101a reaches the higher threshold value "icH" after the injection command signal has become high. In the case shown in FIG. 3, because the capacitor voltage VC is higher than the battery voltage VB, the coil 101a is supplied with current by the capacitor C0.

Through the constant current control, after the transistor has been turned off, a constant current is supplied from the power source line Lp through the transistor T11 and the diode D11 to the coil 101a. Because of the constant current, the injector 101 is held in the open state. The diode D12 serves as a feedback diode used for the constant current control. Specifically, when the transistor T11 is turned off, the current flowing through the coil 101a is fed back through the diode D12.

After that, the injection command signal S#1 from the microcomputer 130 changes from high to low. Thereupon, the drive control circuit 120 turns off the transistor T10 and terminates the constant current control by terminating the turning on and off of the transistor T11 so as to hold the transistor in the OFF state. As a result, the current application to the coil 101a is stopped and the valve of the injector 101 is closed, thus stopping the fuel injecting operation of the injector 101.

When the injection command signal S#1 changes to low and the transistor T10 and the transistor T11 are turned off, a fly-back energy occurs in the coil 101a. The fly-back energy is recovered in an electrical-current form to the capacitor C0 by way of the diode D10. While the injection command signal is high, the drive control circuit 120 sends an inactive charge permissive signal to the charging control circuit 110 so as to inhibit the operation of charging the capacitor C0 by means of the voltage boosting circuit 50. Then, upon reception of the injection command signal at a low level, the drive control circuit 120 returns the charge permissive signal to the active state so as to restart the operation of charging the capacitor C0 by means of the voltage boosting circuit 50, for providing for the next injector drive. It should be noted that other injectors 101, those for cylinders #2-4, are driven by the same procedure as that described above.

Figure 4A:
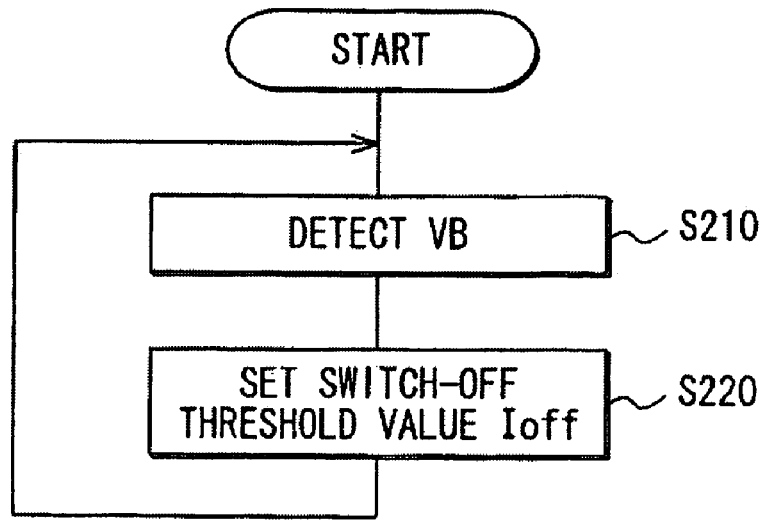
FIG. 4A is a flow chart illustrating an exemplary process of setting a switch-off threshold value carried out according to a first embodiment.

In particular, in the present embodiment, the charging control circuit 110 of the voltage boosting circuit 50 performs processing of setting a switch-off threshold value as illustrated in FIG. 4A in parallel with the processing of the voltage-boost switching control illustrated in FIG. 2.

Figure 4B:
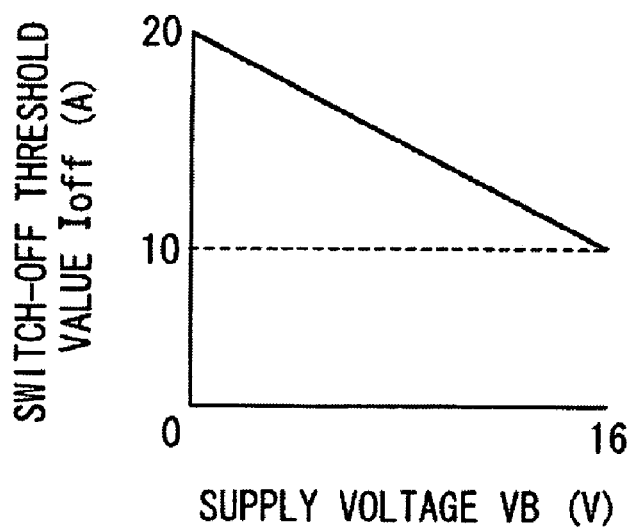
FIG. 4B is a graph illustrating an exemplary process of setting a switch-off threshold value carried out according to a first embodiment.

Specifically, as shown in FIG. 4A, the charging control circuit 110 detects the battery voltage VB at S210. Then, the charging control circuit 110 sets a switch-off threshold value Ioff used in the voltage-boost switching control in accordance with the detected value of the battery voltage VB at S220. Specifically, as shown in FIG. 4B, the lower the battery voltage VB, the higher the value at which the switch-off threshold value Ioff is set.

Figure 5:
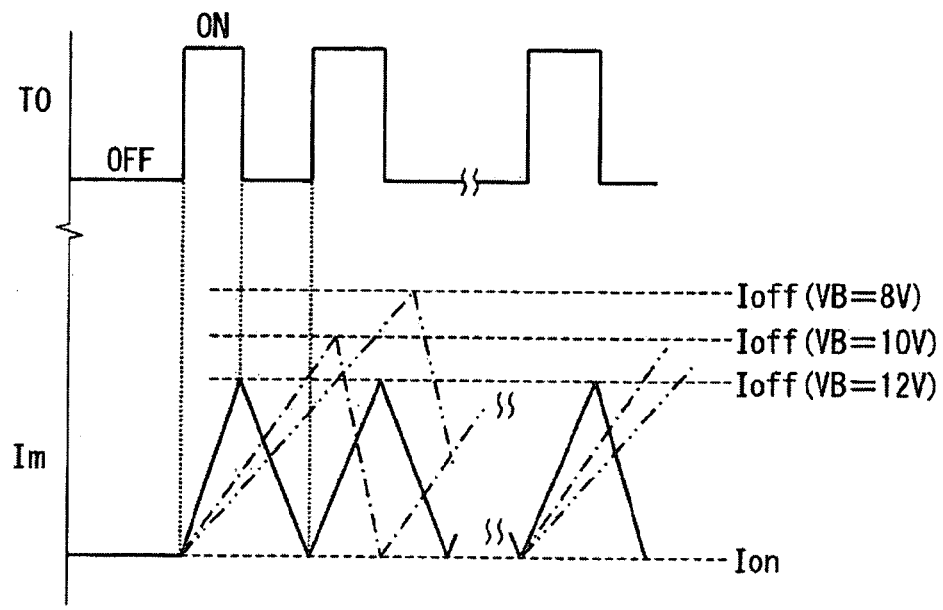
FIG. 5 is a diagram illustrating exemplary operation of a first embodiment.

As shown in FIG. 5, the voltage boosting circuit 50 of a first embodiment is capable of setting a switch-off threshold value Ioff of a higher value for use in the voltage-boost switching control when the battery voltage VB becomes low. The increase in the switch-off threshold value Ioff causes an increase in the energy stored in the coil L0 when the step-up switch T0 is in the ON position, thus making it possible to increase the energy charged to the capacitor C0 by the single operation of switching the step-up switch T0 between the ON and OFF positions and to avoid an inadequacy in the step-up capability caused by a drop in the battery voltage VB.

Figure 6A:
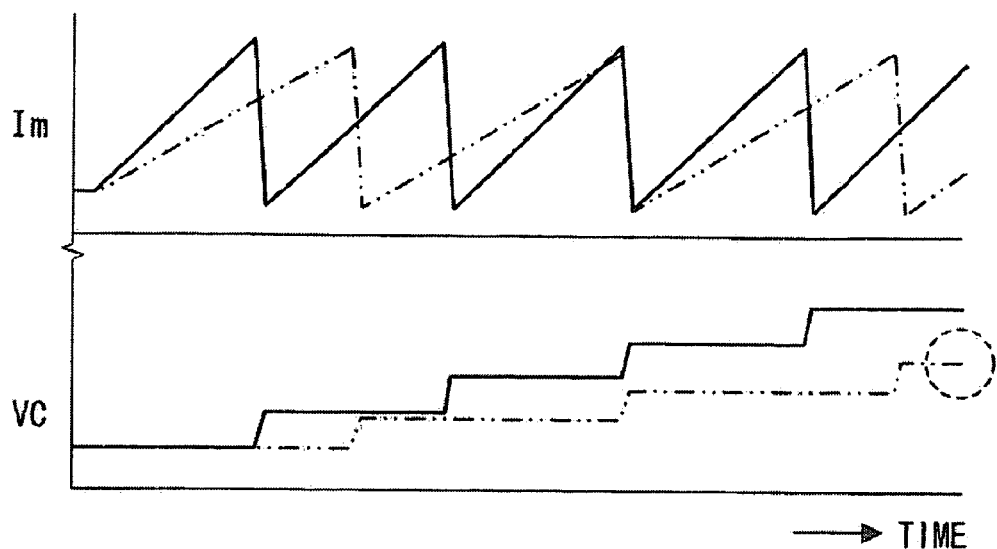
FIG. 6A is a diagram illustrating disadvantageous effects of a conventional configuration.
Figure 29:
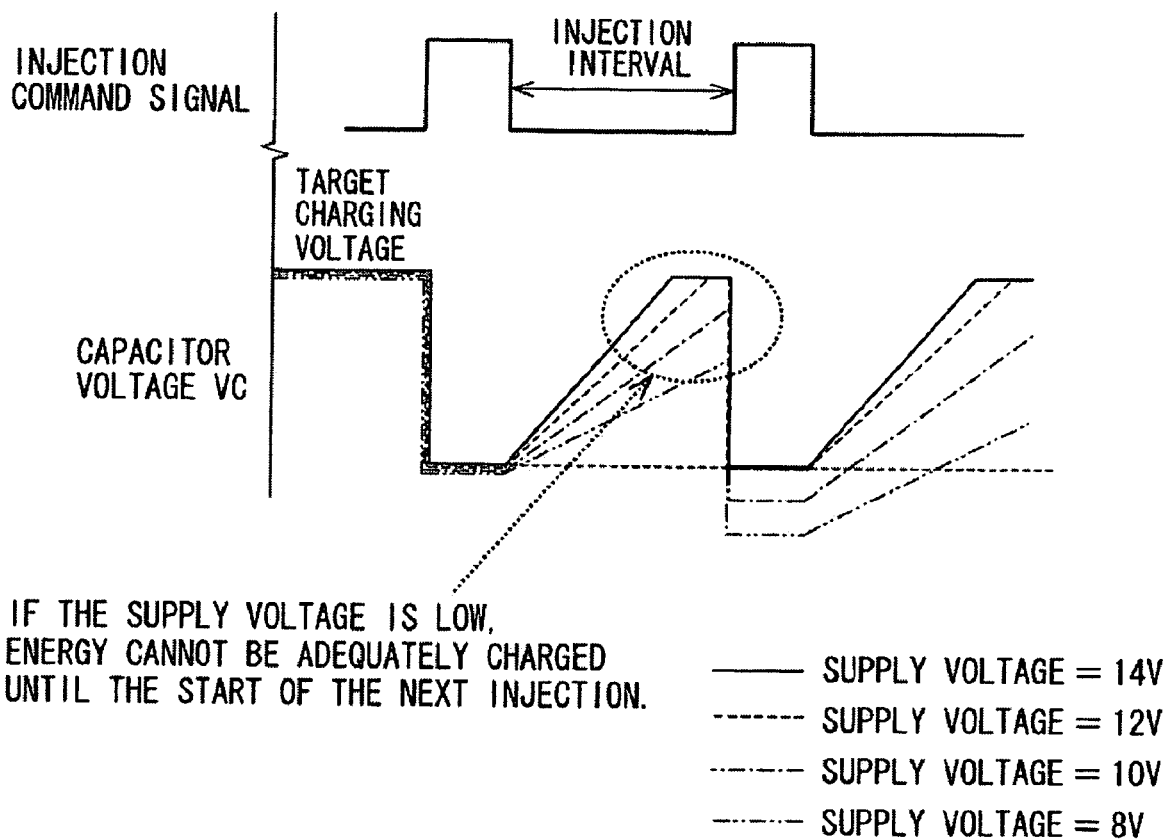
FIG. 29 is a diagram illustrating exemplary disadvantages associated with the related art.

For example, in connection with the boost performance in accordance with a conventional voltage boosting circuit, as shown in FIG. 6A, the amount of increase in the capacitor voltage VC per unit time decreases when the power supply voltage—battery voltage VB—drops from 14V to 8V. As shown in FIG. 29, it is impossible to boost the capacitor voltage VC to a target charge voltage within the period of time between when electrical energy has been discharged from the capacitor C0 for accomplishing fuel injection and when the next fuel injection is started.

Figure 7:
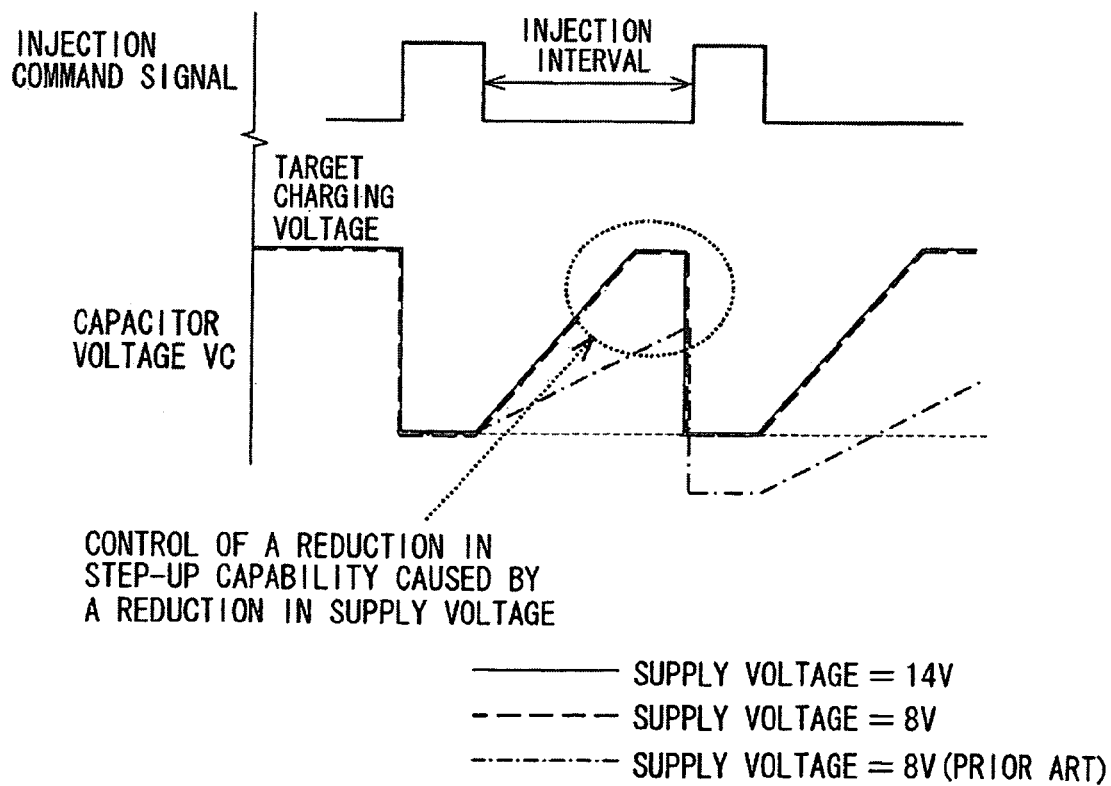
FIG. 7 is diagram further illustrating advantageous effects of a first embodiment.
Figure 6B:
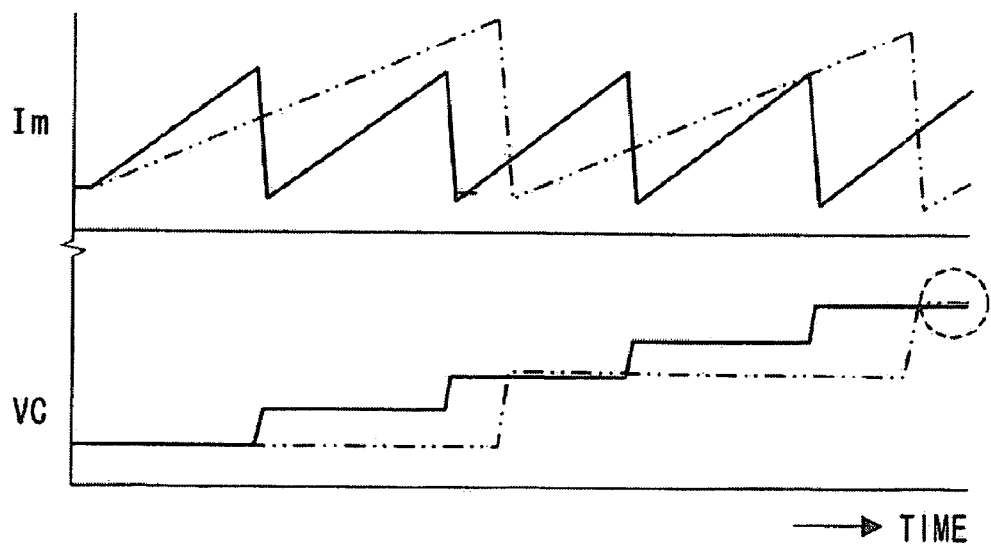
FIG. 6B is a diagram illustrating exemplary advantageous effects of a first embodiment.

By contrast, in accordance with the voltage boosting circuit 50 of a first embodiment, as shown in FIG. 6B, the voltage for charging the capacitor C0 is boosted by the single operation of switching the step-up switch T0 between the ON and OFF positions even when the power supply voltage—battery voltage VB—drops from 14V to 8V. Thus, an extraordinary result is that the capacitor voltage VC can increase approximately to the same level and in the same time period under low voltage conditions as the capacitor voltage VC increases when the battery voltage VB is 14V. As shown in FIG. 7, even if the battery voltage VB drops, it is possible to boost the capacitor voltage VC to the target charge voltage during the period between the time when electrical energy has been discharged from the capacitor C0 for fuel injection and the time when the next fuel injection is started. The injector can consequently be driven with high accuracy.

In FIGS. 6A and 6B, and other figures to be described in greater detail hereinafter, the term Im denotes the current flowing through the resistor R0 and through the coil L0. A portion of the graphs showing an increasing value of the current Im corresponds to the time period where the step-up switch T0 is in the ON position, and represents the current flowing through the step-up switch T0 into the coil L0. On the other hand, a decreased portion of the current Im corresponds to the time period while the step-up switch T0 is in the OFF position, and represents the current flowing from the coil L0 into the capacitor C0 to charge the capacitor C0.

In the present embodiment, the charging control circuit 110 in the voltage boosting circuit 50 corresponds to control means.

The switch-off threshold value Ioff may be changed step by step in accordance with the battery voltage VB. For example, the switch-off threshold value Ioff is set to a first value Ioff1 when the battery voltage VB is higher than a certain value Vth, and set to a second value Ioff2 higher than the first value Ioff1 when the battery voltage VB is not higher than a certain value Vth.

Second Embodiment

The structural components in the following description are designated by using the same reference numerals and phrases as those in a first embodiment, and the other embodiments to be described in greater detail hereinafter.

Figure 8A:
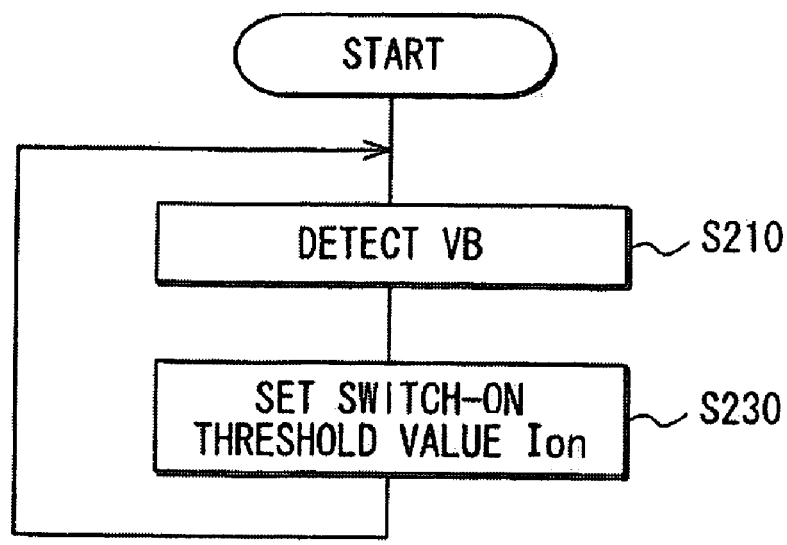
FIG. 8A is a flow chart illustrating an exemplary process of setting a switch-on threshold value capable of being carried out by a charging control circuit of a second embodiment.

The fuel injection controller 100 of a second embodiment differs from the fuel injection controller 100 of a first embodiment in that the charging control circuit 110 of the voltage boosting circuit 50 performs processing of setting the switch-on threshold value as illustrated in FIG. 8A in parallel with the processing of the voltage boost switching control illustrated in FIG. 2.

Figure 8B:
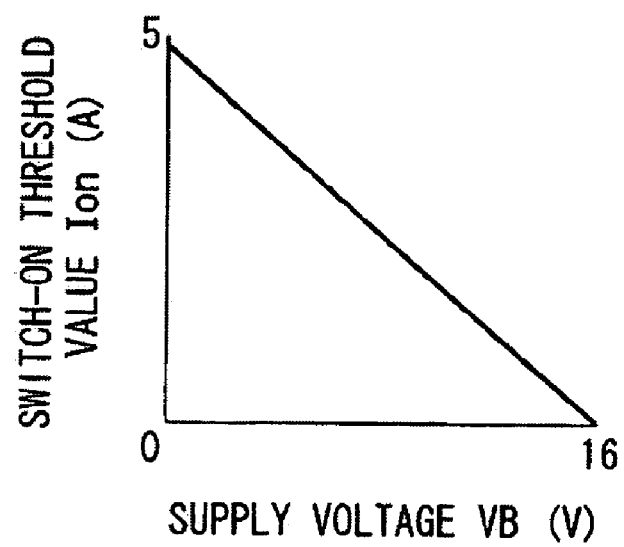
FIG. 8B is a graph further illustrating aspects of setting a switch-on threshold value carried out in accordance with a second embodiment.

As shown in FIG. 8A, the charging control circuit 110 detects the battery voltage VB at S210, and then sets a switch-on threshold value Ion for use in the voltage-boost switching control in accordance with the detected value of the battery voltage VB at S230. Specifically, as shown in FIG. 8B, the lower the battery voltage VB, the higher the value at which the switch-on threshold value Ion is set.

Figure 9A:
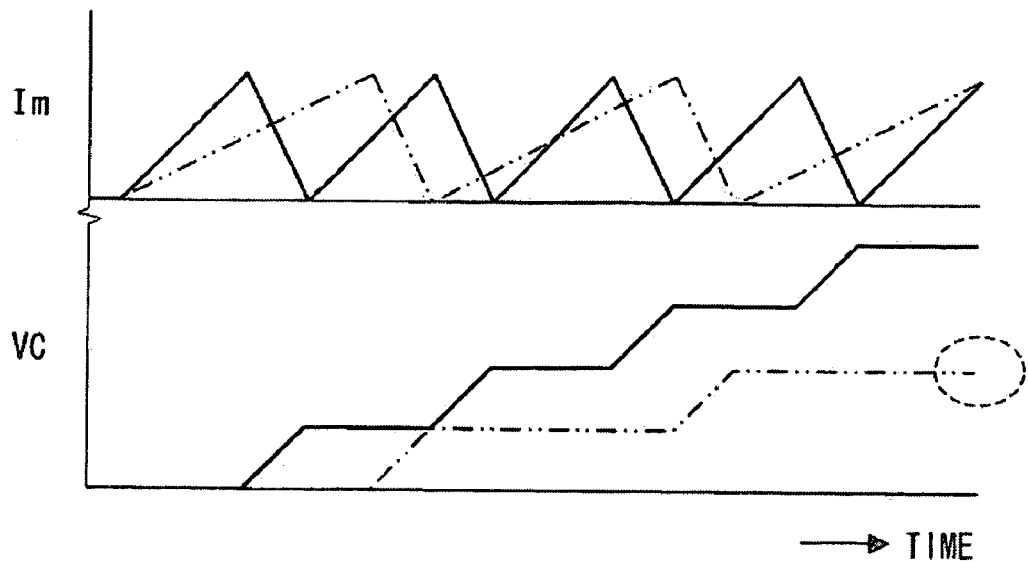
FIG. 9A is a diagram illustrating disadvantageous effects of a conventional configuration.
Figure 9B:
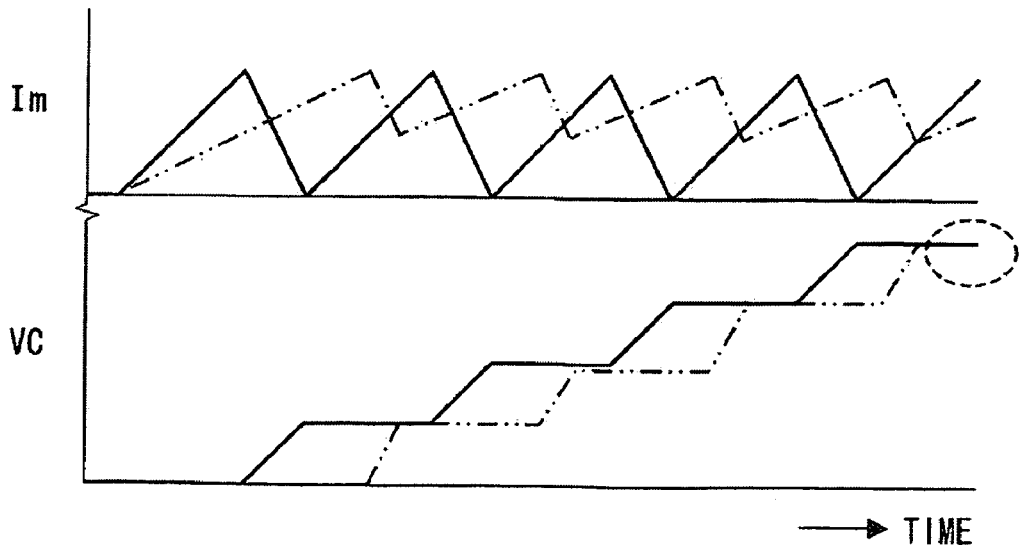
FIG. 9B is a diagrams illustrating exemplary advantageous effects of a second embodiment.

FIG. 9A shows the current Im of the resistor R0 and the capacitor voltage VC in a conventional voltage boosting circuit. FIG. 9B shows the current Im of the resistor R0 and the capacitor voltage VC in the voltage boosting circuit 50 of a second embodiment.

As is seen from a comparison between the chain double-dashed line in FIG. 9A and the chain double dashed-line in FIG. 9B, in the voltage boosting circuit 50 of a second embodiment, when the battery voltage VB becomes low, for example, when the battery voltage VB decreases from 14V to 8V as in the case in FIG. 9A and FIG. 9B, because the switch-on threshold value Ion is set at a high value, the OFF time period of the step-up switch T0 is shorter than the OFF time period when the switch-on threshold value Ion is not changed. Accordingly, the number of times that the step-up switch T0 is switched between the ON and OFF positions per fixed time is increased, thus making it possible to increase the number of times of charging the capacitor C0 per fixed time. It is thereby possible to avoid an inadequacy in the step-up capability caused by a drop in the battery voltage VB.

As shown in FIG. 9B, even when the battery voltage VB drops from 14V to 8V, the capacitor voltage VC can increase approximately to the same level and in the same time period as the capacitor voltage VC increases when the battery voltage VB is 14V. Accordingly, as in the case of a first embodiment, even if the battery voltage VB drops, it is possible to boost the capacitor voltage VC to the target charge voltage during the period between the time when electrical energy has been discharged from the capacitor C0 for fuel injection and the time when the next fuel injection is started. The injector can thereby be driven with high accuracy.

It should be noted that the switch-on threshold value Ion may be changed step by step in accordance with the battery voltage VB. For example, the switch-on threshold value Ion is set to a first value Ion1 when the battery voltage VB is higher than a certain value Vth, and set to a second value Ion2 higher than the first value Ion1 when the battery voltage VB is not higher than a certain value Vth.

Third Embodiment

The fuel injection controller 100 of a third embodiment differs from the fuel injection controller 100 of a first embodiment in at least the following two points.

Figure 10:
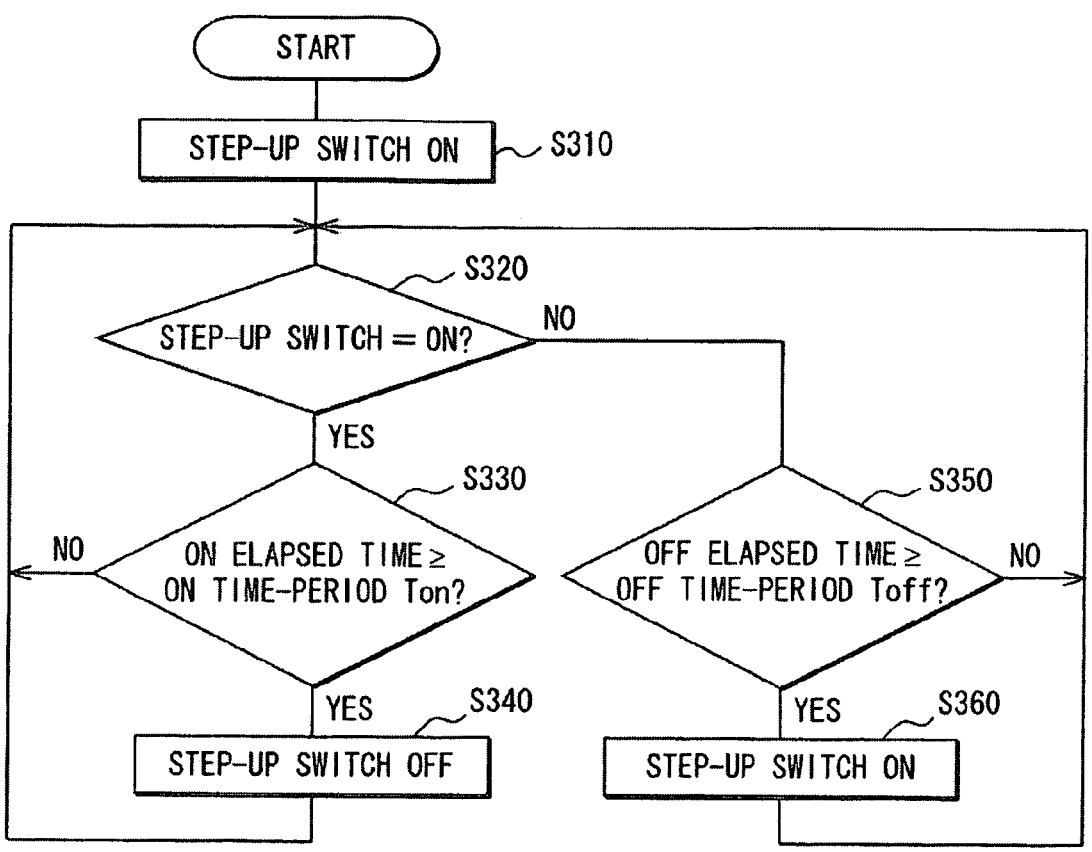
FIG. 10 is a flowchart illustrating exemplary steps in a voltage-boost switching operation controlled by a charging control circuit of a third embodiment.

First, the charging control circuit 110 of the voltage boosting circuit 50 performs processing of the voltage-boost switching control as shown in FIG. 10 instead of the processing of the voltage-boost switching control as shown in FIG. 2. The charging control circuit 110 turns on the step-up switch T0 at the start of the voltage-boost switching control at S3310. Upon determining that the step-up switch T0 is turned on, corresponding to YES at S320, the charging control circuit 110 waits until an ON elapsed time since the last operation of turning the step-up switch T0 to the on position reaches a time Ton, corresponding to NO at S330. Upon determining that the ON elapsed time reaches the time Ton, corresponding to YES at S330, the charging control circuit 110 turns the step-up switch T0 to the off position at S340.

Upon determining that the step-up switch T0 is turned off, corresponding to NO at S320, the charging control circuit 110 waits until an OFF elapsed time since the last operation of turning the step-up switch T0 to the off position reaches an OFF time Toff, corresponding to NO at S350. Then, upon determining that the OFF elapsed time reaches the OFF time Toff, corresponding to YES at S350, the charging control circuit 110 turns on the step-up switch T0 at S360.

By repeating the operation as described above, the charging control circuit 110 repeatedly turns the step-up switch T0 on and off to charge the capacitor C0 in stages. In the voltage-boost switching control in a third embodiment, the current Im passing through resistor R0 is not monitored, and the step-up switch T0 is controlled to be in the ON position for the period of the ON time Ton and to be in the OFF position for the period of the OFF time Toff. Accordingly, a third embodiment omits the resistor R0 in the voltage boosting circuit 50.

Figure 11A:
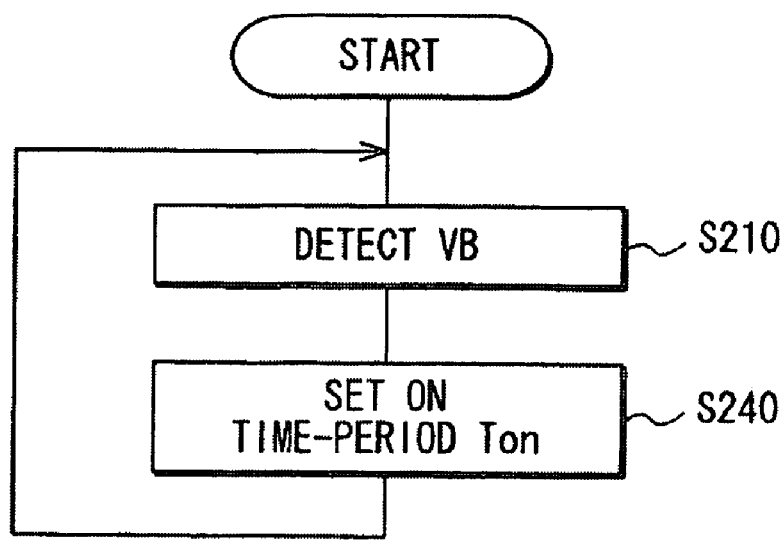
FIG. 11A is a flow chart illustrating an exemplary process of setting an ON time period capable of being carried out by the charging control circuit of a third embodiment.
Figure 11B:
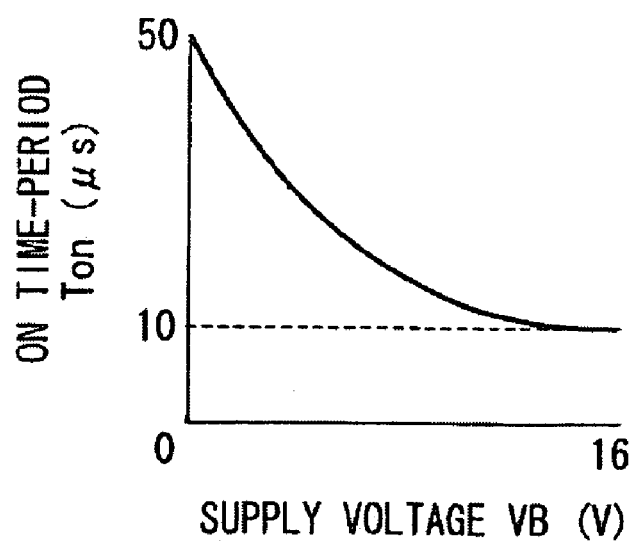
FIG. 11B is a graph further illustrating an exemplary process of setting an ON time period in accordance with a third embodiment.

Second, the charging control circuit 110 of the voltage boosting circuit 50 performs processing of setting an ON time period shown in FIG. 11A in parallel with the processing of the voltage boost switching control shown in FIG. 10. The charging control circuit 110 detects the battery voltage VB at S210, then sets the ON time Ton for use in the voltage-boost switching control in accordance with the detected value of the battery voltage VB at S240. Specifically, as shown in FIG. 11B, the lower the battery voltage VB, the higher the value at which the ON time Ton is set, that is, the longer the ON time Ton is set.

Figure 12A:
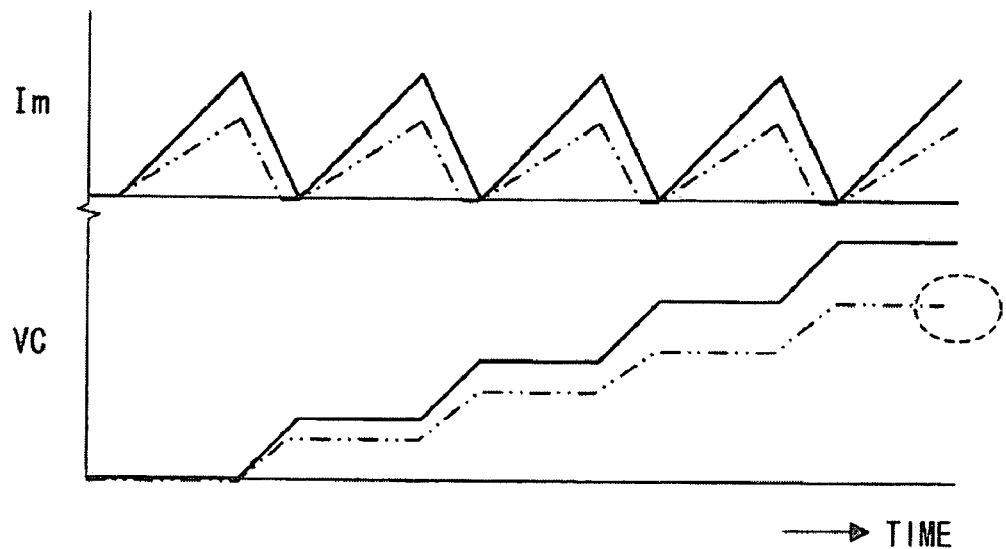
FIG. 12A is a diagram illustrating disadvantageous effects of a conventional configuration.
Figure 12B:
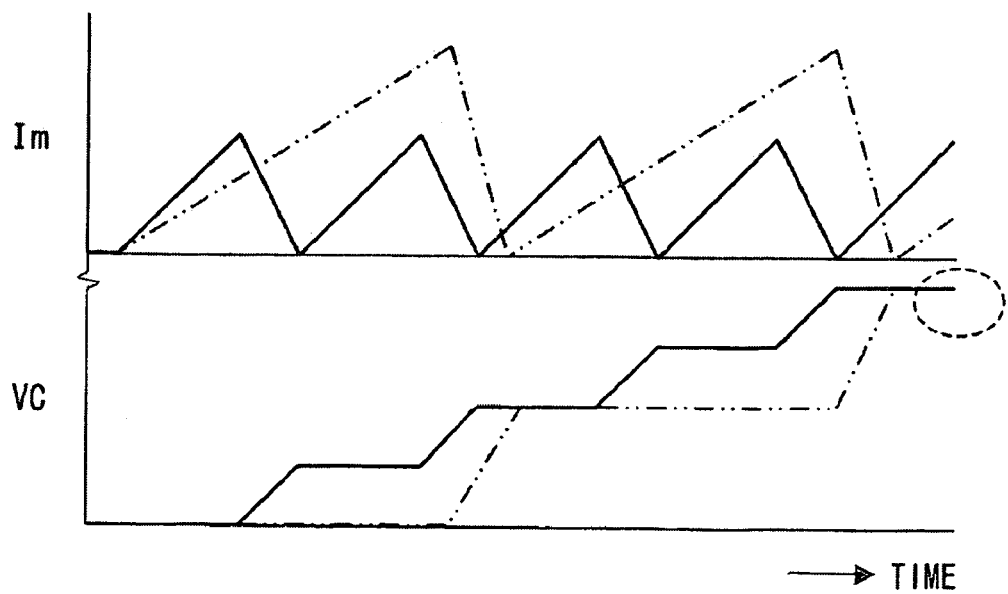
FIG. 12B is a diagram illustrating exemplary advantageous effects of a third embodiment.

FIG. 12A shows the current Im and the capacitor voltage VC when the process of setting the ON time period shown in FIG. 11A is not performed, that is, when the ON time Ton is not changed, as in a conventional configuration. FIG. 12B shows the current Im and the capacitor voltage VC in the voltage boosting circuit 50 in a third embodiment. Because the resistor R0 is omitted in a third embodiment, the current Im in the FIG. 12A and FIG. 12B flows into the coil L0.

As is seen from a comparison between the chain double-dashed line in FIG. 12A and the chain double-dashed line in FIG. 12B, in the voltage boosting circuit 50 of a third embodiment, when the battery voltage VB becomes low, for example, when the battery voltage VB decreases from 14V to 8V as in the case of FIG. 12A and FIG. 12B, because the ON time Ton while the step-up switch T0 is in the ON position is set longer, the amount of energy accumulated in the coil L0 while the step-up switch is in the ON position is increased. As a result, the energy charged to the capacitor C0 by the single operation of switching the step-up switch T0 between the ON and OFF positions can be increased. Accordingly, it is possible to avoid an inadequacy in the step-up capability caused by a drop in the battery voltage VB.

That is, as shown in FIG. 12B, even when the battery voltage VB drops from 14V to 8V, the capacitor voltage VC can increase approximately to the same level and in the same time period as the capacitor voltage VC increases when the battery voltage VB is 14V. Accordingly, as in the case of the first and second embodiments, even if the battery voltage VB drops, it is possible to boost the capacitor voltage VC to the target charge voltage during the period between the time when electrical energy has been discharged from the capacitor C0 for fuel injection and the time when the next fuel injection is started. In consequence, the injector can be driven with high accuracy.

The ON time Ton may be changed step by step in accordance with the battery voltage VB. For example, the ON time Ton is set to a first value Ton1 when the battery voltage VB is higher than a certain value Vth, and set to a second value Ton2 higher than the first value Ton1 when the battery voltage VB is not higher than a certain value Vth.

Fourth Embodiment

Figure 13A:
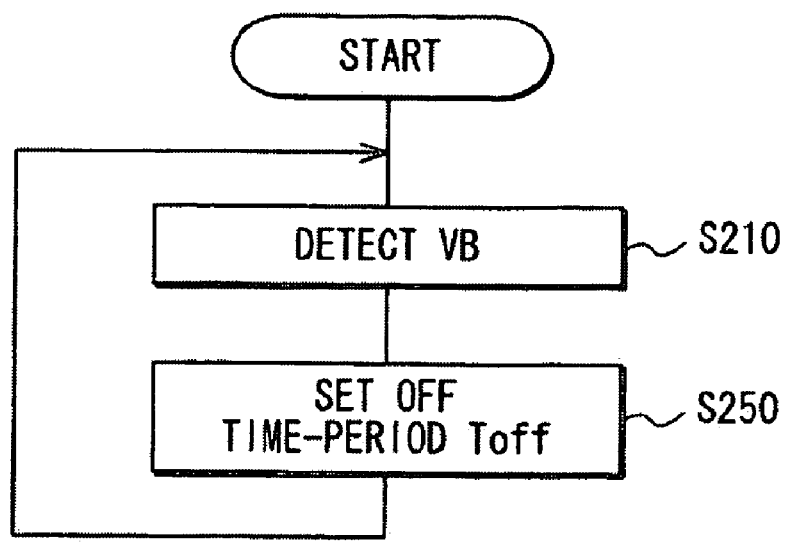
FIG. 13A is a flow chart illustrating an exemplary process of setting an OFF time period capable of being carried out by the charging control circuit of a fourth embodiment.

The fuel injection controller 100 of a fourth embodiment differs from the fuel injection controller 100 of a third embodiment in that the charging control circuit 110 of the voltage boosting circuit 50 performs processing of setting an OFF time period shown in FIG. 13A in parallel with the processing of the voltage boost switching control shown in FIG. 10.

Figure 13B:
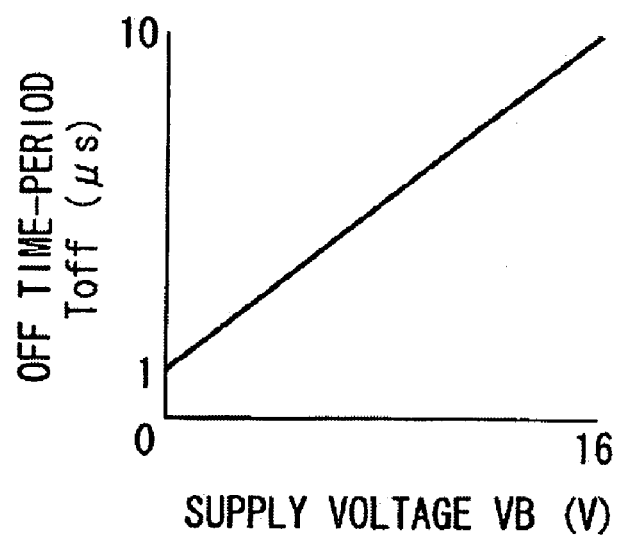
FIG. 13B is a graph further illustrating an exemplary process of setting an OFF time period in accordance with a fourth embodiment.

As shown in FIG. 13A, the charging control circuit 110 detects the battery voltage VB at S210, then sets the OFF time Toff for use in the voltage-boost switching control in accordance with the detected value of the battery voltage VB at S250. Specifically, as shown in FIG. 13B, the lower the battery voltage VB, the lower the value at which the OFF time Toff is set, that is, the shorter the OFF time Toff is set.

Figure 14A:
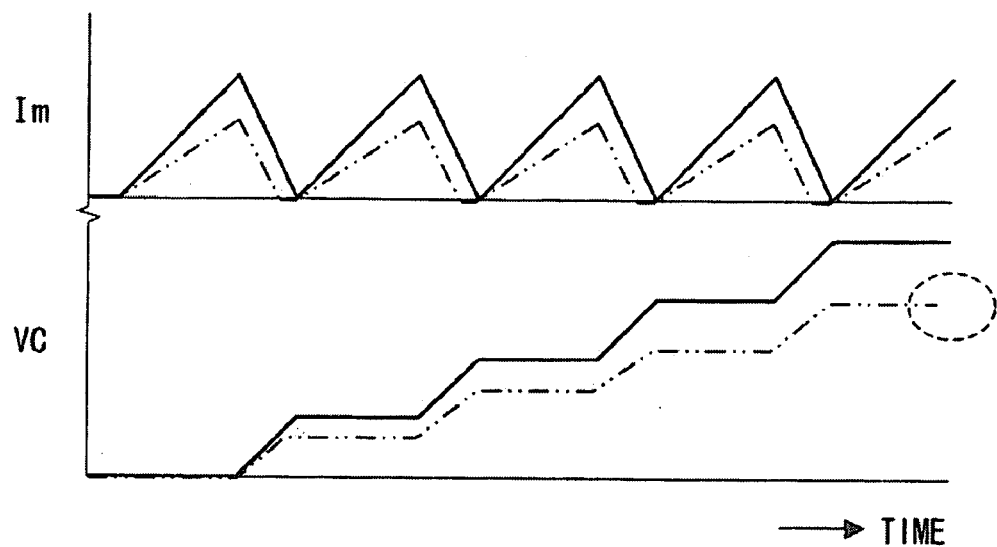
FIG. 14A is a diagram illustrating disadvantageous effects off a conventional configuration.
Figure 14B:
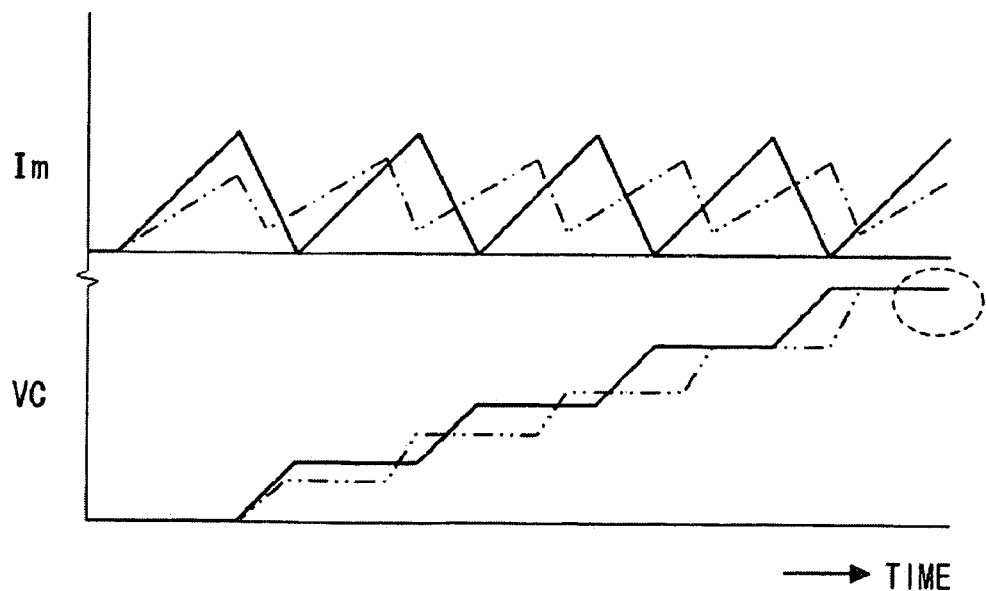
FIG. 14B is a diagram illustrating exemplary advantageous effects of a fourth embodiment.

FIG. 14A shows the current Im and the capacitor voltage VC when the process of setting the OFF time period shown in FIG. 13A is not performed, that is, when the OFF time Toff is not changed, such as in a conventional configuration. FIG. 14B shows the current Im and the capacitor voltage VC in the voltage boosting circuit 50 in a fourth embodiment. The resistor R0 is also omitted in a fourth embodiment. Accordingly, the current Im in the FIG. 14A and FIG. 14B flows into the coil L0.

As can be seen from a comparison between the chain double-dashed line in FIG. 14A and the chain double-dashed line in FIG. 14B, in the voltage boosting circuit 50 of a fourth embodiment, when the battery voltage VB becomes low, for example, when the battery voltage VB decreases from 14V to 8V as in the case of FIG. 14A and FIG. 14B, because the time that the step-up switch T0 is in the OFF position—the OFF time Ton,—is set shorter, the number of times of switching the step-up switch T0 between the ON and OFF positions per fixed time is increased, thus making it possible to increase the number of times of charging the capacitor C0 per fixed time and to thereby possibly avoid an inadequacy in the step-up capability caused by a drop in the battery voltage VB.

That is, as shown in FIG. 14B, even when the battery voltage VB drops from 14V to 8V, the capacitor voltage VC can increase approximately to the same level and in the same time period as the capacitor voltage VC increases when the battery voltage VB is 14V. Accordingly, as in the case of the first, second and third embodiments, even if the battery voltage VB drops, it is possible to boost the capacitor voltage VC to the target charge voltage during the period between the time when electrical energy has been discharged from the capacitor C0 for fuel injection and the time when the next fuel injection is started. The injector can thereby be driven with high accuracy.

The OFF time Toff may be changed step by step in accordance with the battery voltage VB. For example, the OFF time Toff is set to a first value Toff1 when the battery voltage VB is higher than a certain value Vth, and set to a second value Toff2 smaller than the first value Toff1 when the battery voltage VB is not higher than a certain value Vth.

Fifth Embodiment

Figure 15A:
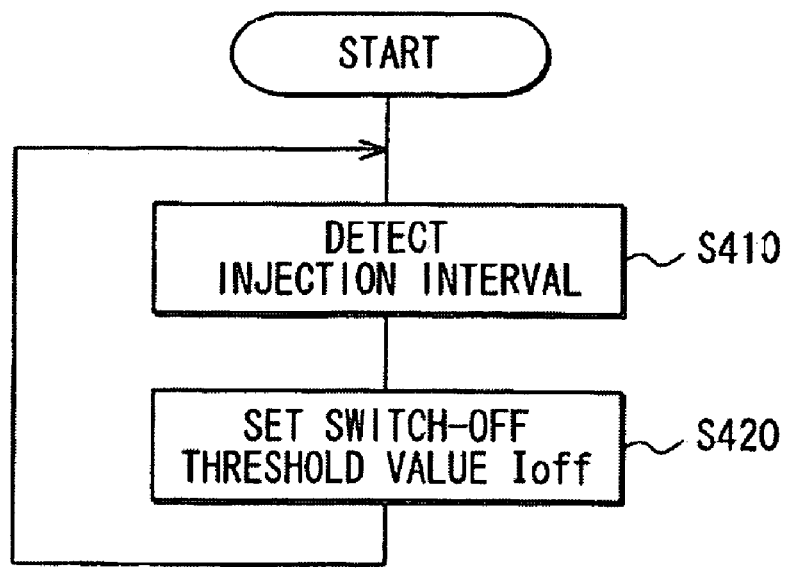
FIG. 15A is a flow chart illustrating an exemplary process of setting a switch-off threshold value capable of being carried out by a charging control circuit of a fifth embodiment.

The fuel injection controller 100 of a fifth embodiment differs from the fuel injection controller 100 of a first embodiment in that the charging control circuit 110 of the voltage boosting circuit 50 performs processing of setting a switch-off threshold value in FIG. 15A instead of the processing of setting the switch-off threshold value in FIG. 4A.

Figure 15B:
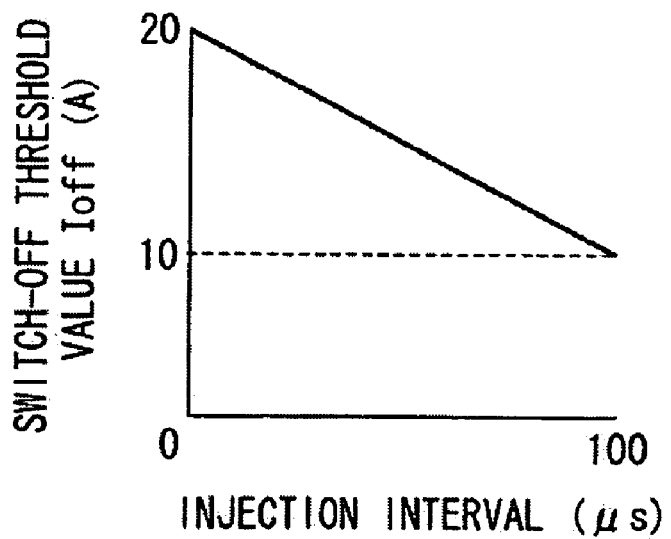
FIG. 15B is a graph further illustrating an exemplary process of setting a switch-off threshold value in accordance with a fifth embodiment.

As shown in FIG. 15A, at S410, the charging control circuit 110 detects an injection time-interval, that is, an interval at which the injector 101 is driven, or an interval at which the capacitor C0 discharges. Then, the charging control circuit 110 sets a switch-off threshold value Ioff for use in the voltage-boost switching control in accordance with the detected injection time-interval at S420. Specifically, as shown in FIG. 15B, the shorter the injection time-interval, the higher the value at which the switch-off threshold value Ioff is set.

For detecting the injection time-interval, the charging control circuit 110 may read from the microcomputer 130 a calculated value of the injection time-interval until the next fuel injection is operated, by way of example. Alternatively, the charging control circuit 110 may measure an interval between the rising edges of the injection command signal supplied from the microcomputer 130, and use the measured value as a detected value of the injection time-interval as in accordance with sixth, seventh and eighth embodiments to be described in greater detail hereinafter.

In the voltage boosting circuit 50 of a fifth embodiment, when the injection time-interval becomes short, a high value is set for the switch-off threshold value Ioff for use in the voltage-boost switching control. In turn, when the switch-off threshold value Ioff is increased, the energy accumulated in the coil L0 when the step-up switch T0 is in the ON position is increased. Thus, it is possible to increase the energy charged to the capacitor C0 by the single operation of switching the step-up switch T0 between the ON and OFF positions. It is thereby possible to avoid the shortening of the injection time-interval which will cause an inadequacy in the step-up capability. Specifically, it can be avoided that the capacitor voltage VC cannot be boosted to the target charge voltage during the period between the time when electrical energy has been discharged from the capacitor C0 for fuel injection and the time when the next fuel injection is started. In consequence, the injector can be driven with high accuracy.

The switch-off threshold value Ioff may be changed step by step in accordance with the injection time-interval. For example, the switch-off threshold value Ioff is set to a first value Ioff1 when the injection time-interval is longer than a certain value Tth, and set to a second value Ioff2 larger than the first value Ioff1 when the injection time-interval is not longer than a certain value Tth.

Sixth Embodiment

Figure 16A:
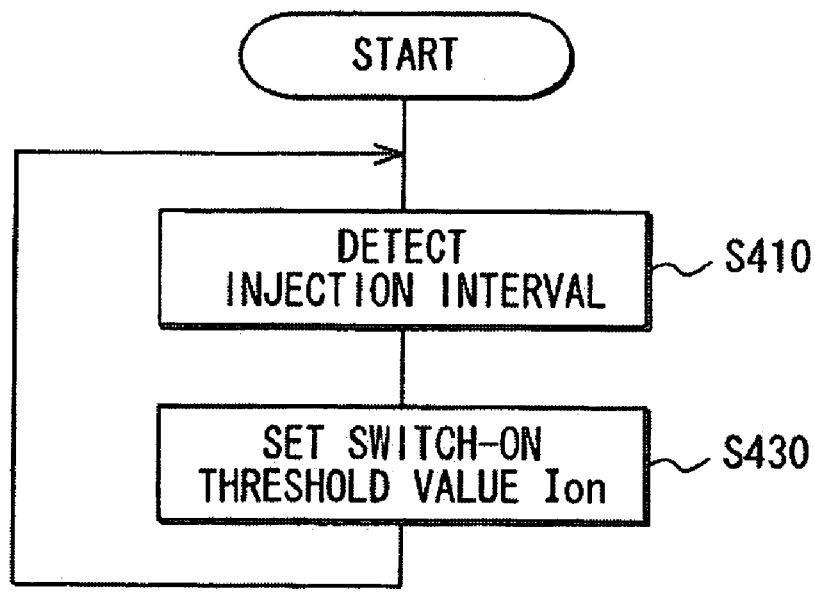
FIG. 16A is a flow chart illustrating an exemplary process of setting a switch-on threshold value capable of being carried out by a charging control circuit of a sixth embodiment.

The fuel injection controller 100 of a sixth embodiment differs from the fuel injection controller 100 of a second embodiment in that the charging control circuit 110 of the voltage boosting circuit 50 performs processing of setting a switch-on threshold value in FIG. 16A instead of the processing of setting the switch-on threshold value in FIG. 8A.

Figure 16B:
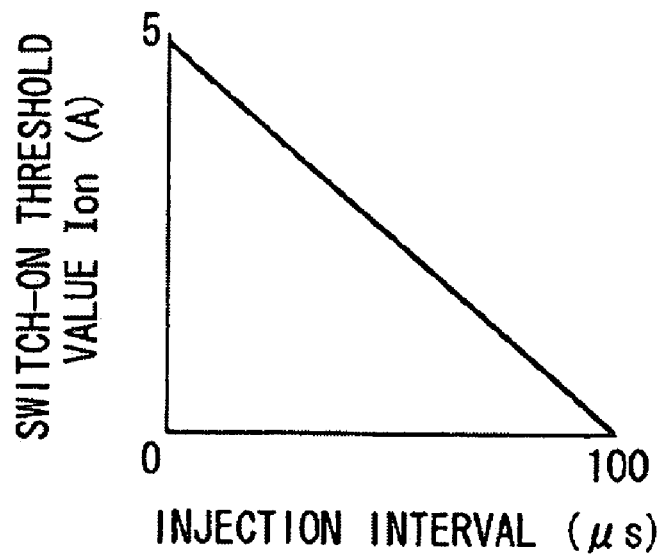
FIG. 16B is a graph further illustrating an exemplary process of setting a switch-on threshold value in accordance with a sixth embodiment.

As shown in FIG. 16A, the charging control circuit 110 detects an injection time-interval at S410. Then, the charging control circuit 110 sets a switch-on threshold value Ion for use in the voltage-boost switching control in accordance with the detected injection time-interval at S430. Specifically, as shown in FIG. 16B, the shorter the injection time-interval, the higher the value at which the switch-on threshold value Ion is set.

In the voltage boosting circuit 50 of a sixth embodiment, when the injection time-interval becomes short, a high value is set for the switch-on threshold value Ion and the OFF time period during which the step-up switch T0 is in the OFF position is shortened. Accordingly, the number of times of switching the step-up switch T0 between the ON and OFF positions per fixed time is increased, making it possible to increase the number of times of charging the capacitor C0 per fixed time. It is thereby possible to avoid an inadequacy in the step-up capability caused by the shortening of the injection time-interval as in the case of a fifth embodiment.

The switch-on threshold value Ion may be changed step by step in accordance with the injection time-interval. For example, the switch-on threshold value Ion is set to a first value Ion1 when the injection time-interval is longer than a certain value Tth, and set to a second value Ion2 larger than the first value Ion1 when the injection time-interval is not longer than a certain value Tth.

Seventh Embodiment

Figure 17A:
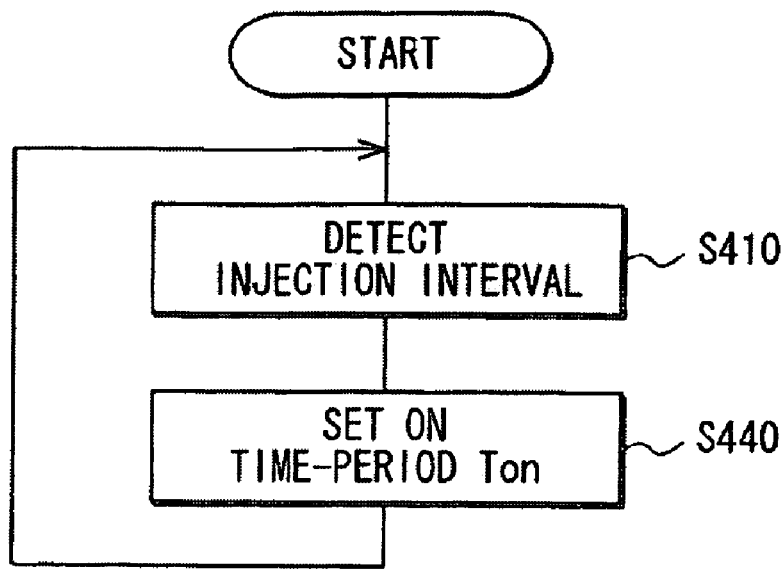
FIG. 17A is a flow chart illustrating an exemplary process of setting an ON time period capable of being carried out by a charging control circuit of a seventh embodiment.

The fuel injection controller 100 of a seventh embodiment differs from the fuel injection controller 100 of a third embodiment in that the charging control circuit 110 of the voltage boosting circuit 50 performs processing of setting an ON time period in FIG. 17A instead of the processing of setting the ON time period in FIG. 11A.

Figure 17B:
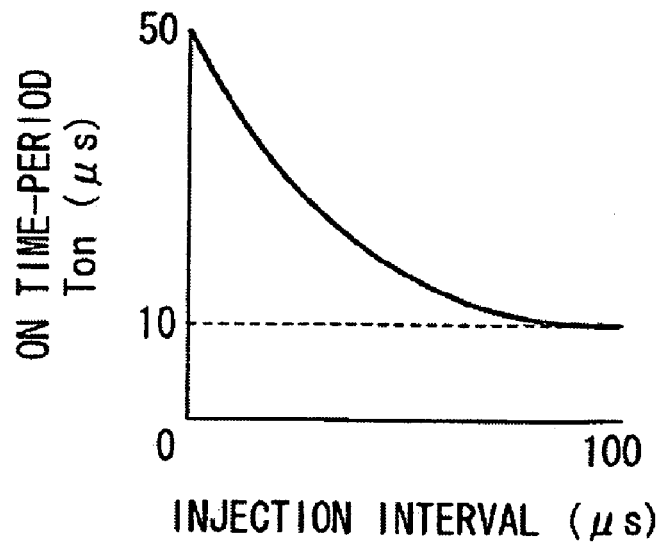
FIG. 17B is a graph illustrating an exemplary process of setting an ON time period in accordance with a seventh embodiment.

As shown in FIG. 17A, the charging control circuit 110 detects an injection time-interval at S410. Then, the charging control circuit 110 sets an ON time Ton for use in the voltage-boost switching control in accordance with the detected injection time-interval at S440. Specifically, as shown in FIG. 17B, the shorter the injection time-interval, the higher the value at which the ON time Ton is set, that is, the longer the ON time Ton is set.

In the voltage boosting circuit 50 of a seventh embodiment, when the injection time-interval becomes short, the ON time Ton, during which the step-up switch T0 is in the ON-position, is set longer. The energy stored in the coil L0 while the step-up switch T0 is in the ON position is increased. As a result, the energy charged to the capacitor C0 by the single operation of switching the step-up switch T0 between the ON and OFF positions can be increased. It is thereby possible to avoid an inadequacy in the step-up capability caused by reducing the length of the injection time-interval as in the case of the fifth and sixth embodiments.

The ON time Ton may be changed step by step in accordance with the injection time-interval. For example, the ON time Ton is set to a first value Ton1 when the injection time-interval is longer than a certain value Tth, and set to a second value Ton2 larger than the first value Ton1 when the injection time-interval is not longer than a certain value Tth.

Eighth Embodiment

Figure 18A:
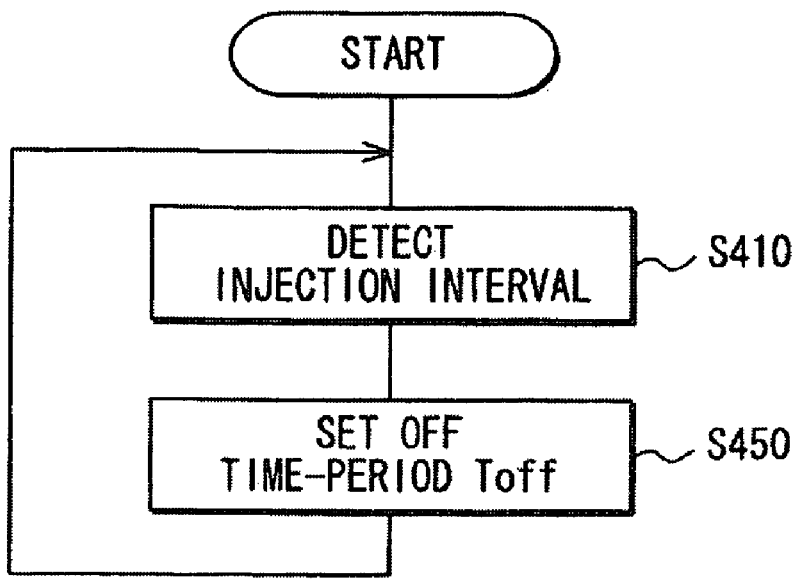
FIG. 18A is a flow chart illustrating an exemplary process of setting an OFF time period capable of being carried out by a charging control circuit of an eighth embodiment.

The fuel injection controller 100 of a eighth embodiment differs from the fuel injection controller 100 of a fourth embodiment in that the charging control circuit 110 of the voltage boosting circuit 50 performs processing of setting an OFF time period in FIG. 18A instead of the processing of setting the OFF time period in FIG. 13A.

Figure 18B:
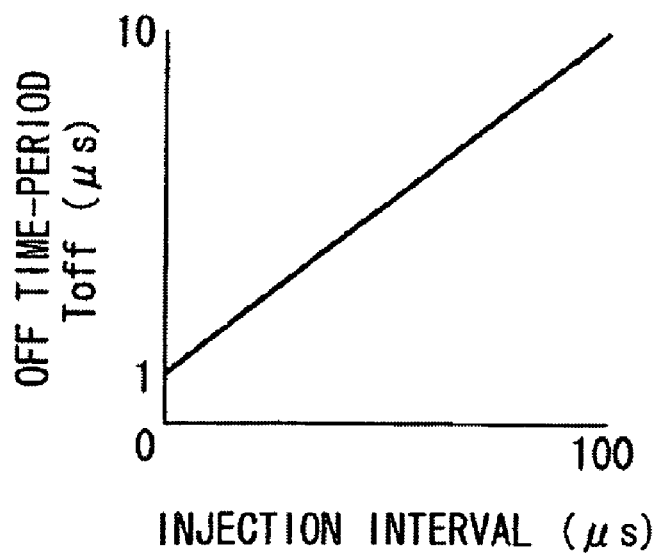
FIG. 18B is a graph illustrating an exemplary process of setting an OFF time period in accordance with an eighth embodiment.

As shown in FIG. 18A, the charging control circuit 110 detects an injection time-interval at S410. Then, the charging control circuit 110 sets an OFF time Toff for use in the voltage-boost switching control in accordance with the detected injection time-interval at S450. Specifically, as shown in FIG. 18B, the shorter the injection time-interval, the lower the value at which the OFF time Toff is set, that is, the shorter the OFF time Toff is set.

In the voltage boosting circuit 50 of a eighth embodiment, when the injection time-interval becomes short, the OFF time Toff, during which the step-up switch T0 is in the OFF position, is set shorter. As a result, the number of times that the step-up switch T0 is switched between the ON and OFF positions per fixed time is increased, making it possible to increase the number of times of charging the capacitor C0 per fixed time. It is thereby possible to avoid an inadequacy in the step-up capability caused by the shortening of the injection time-interval as in the case of the fifth, sixth and seventh embodiments.

I should be noted that the OFF time Toff may be changed step by step in accordance with the injection time-interval. For example, the OFF time Toff is set to a first value Toff1 when the injection time-interval is longer than a certain value Tth, and set to a second value Toff2 smaller than the first value Toff1 when the injection time-interval is not longer than a certain value Tth.

Ninth Embodiment

Figure 19A:
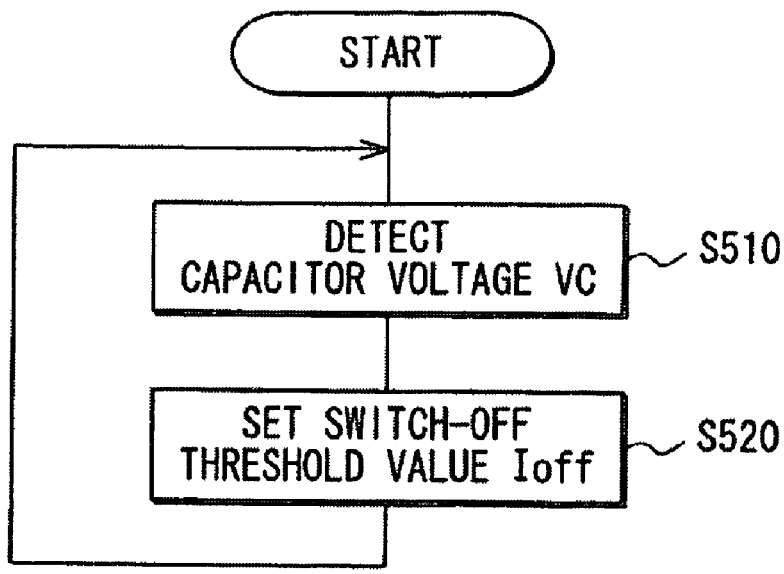
FIG. 19A is a flow chart illustrating an exemplary process of setting a switch-off threshold value capable of being carried out by a charging control circuit of a ninth embodiment.

The fuel injection controller 100 of a ninth embodiment differs from the fuel injection controller 100 of a first embodiment in that the charging control circuit 110 of the voltage boosting circuit 50 performs processing of setting a switch-off threshold value as shown in FIG. 19A, instead of the processing of setting the switch-off threshold value as shown in FIG. 4A.

Specifically, as shown in FIG. 19A, the charging control circuit 110 detects a capacitor voltage VC immediately before the start of the driving of the injector 101 at S510. More specifically, in a ninth embodiment, the microcomputer 130 sends a timing signal to the charging control circuit 110 immediately before sending the injection command signal. Then, the charging control circuit 110 operates a voltage detection circuit to the capacitor voltage VC whenever the charging control circuit 110 receives the timing signal. The voltage detection circuit includes a built-in partial pressure resistor and an A/D converter as do the tenth, eleventh and twelfth embodiments described in greater detail hereinafter.

Figure 19B:
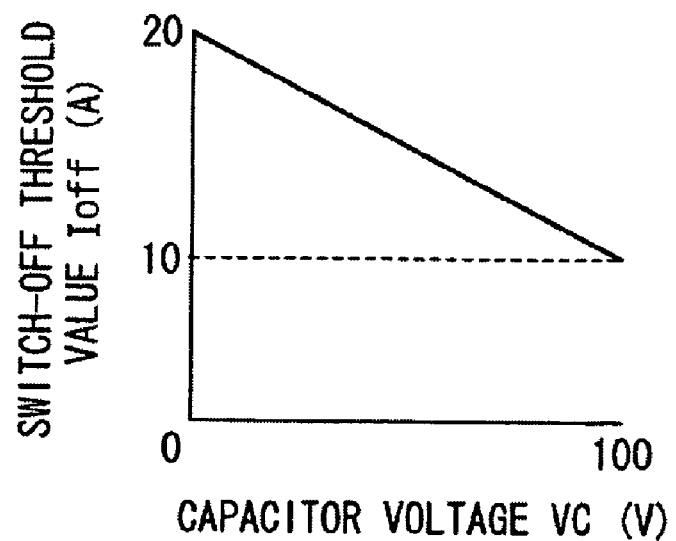
FIG. 19B is a graph illustrating an exemplary process of setting a switch-off threshold value in accordance with a ninth embodiment.

In addition, at S520, the charging control circuit 110 sets a switch-off threshold value Ioff for use in the voltage-boost switching control in accordance with the detected value of the capacitor voltage VC. Specifically, as shown in FIG. 19B, the lower the detected capacitor voltage VC, the larger the value at which the switch-off threshold value Ioff is set.

In the voltage boosting circuit 50 of a ninth embodiment, if the battery voltage VB drops, the injection time-interval is shortened, or the interval at which the injector 101 is driven is shortened, the capacitor voltage VC is reduced immediately before the start of the driving of the injector 101 and the switch-off threshold value Ioff is set to a high value. As described, the high switch-off threshold value Ioff causes an increase in the energy stored in the coil L0 when the step-up switch T0 is turned on, resulting in an increase in the energy charged to the capacitor C0 by the single operation of switching the step-up switch T0 between the ON and OFF positions. Thus, it is possible to boost the reduced capacitor voltage VC, which, in turn, makes it possible to avoid an inadequacy in the step-up capability caused by a drop in the battery voltage VB or the shortening in the injection interval.

The switch-off threshold value Ioff may be changed step by step in accordance with the capacitor voltage VC. For example, the switch-off threshold value Ioff is set to a first value Ioff1 when the capacitor voltage VC is higher than a certain value VCth, and set to a second value Ioff2 larger than the first value Ioff1 when the capacitor voltage VC is not larger than a certain value VCth.

Tenth Embodiment

Figure 20A:
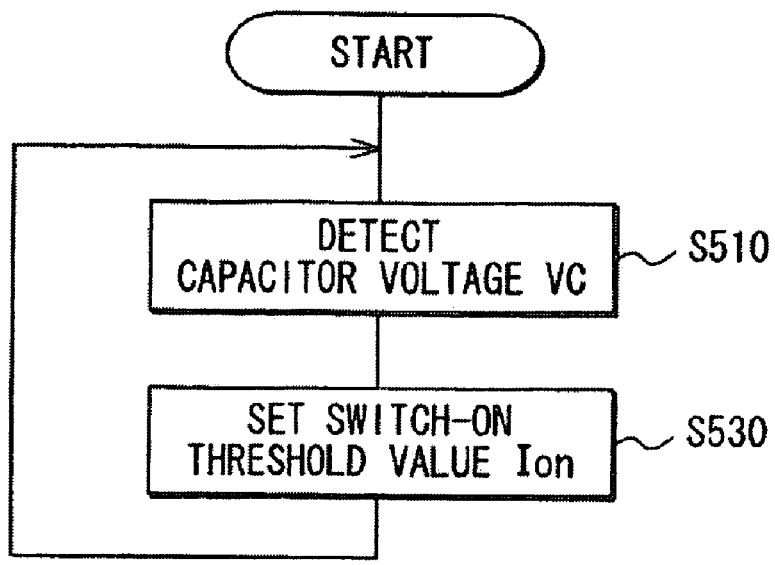
FIG. 20A is a flow chart illustrating an exemplary process of setting a switch-on threshold value capable of being carried out by a charging control circuit of a tenth embodiment.

The fuel injection controller 100 of a tenth embodiment differs from the fuel injection controller 100 of a second embodiment in that the charging control circuit 110 of the voltage boosting circuit 50 performs processing of setting a switch-on threshold value, as illustrated in FIG. 20A, instead of the processing of setting a switch-on threshold value as illustrated in FIG. 8A.

Figure 20B:
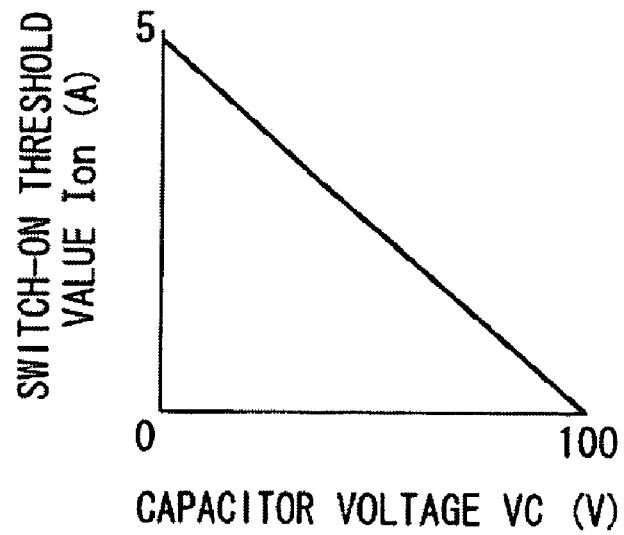
FIG. 20B is a graph illustrating an exemplary process of setting a switch-on threshold value a tenth embodiment.

As shown in FIG. 20A, the charging control circuit 110 detects a capacitor voltage VC immediately before the start of the driving of the injector 101 at S510, and then sets a switch-on threshold value Ion for use in the voltage-boost switching control in accordance with the detected value at S530. Specifically, as shown in FIG. 20B, the lower the detected capacitor voltage VC, the higher the value at which the switch-on threshold value Ion is set.

In the voltage boosting circuit 50 of a tenth embodiment, if the battery voltage VB drops or the injection time-interval is shortened, the capacitor voltage VC is reduced immediately before the start of the driving of the injector 101 and the switch-on threshold value Ion is set to a high value. Accordingly, the OFF time Toff, during which the step-up switch T0 is in the OFF position, is shorter. As a result, the number of times that the step-up switch T0 is switched between the ON and OFF positions per fixed time is increased, thus making it possible to increase the number of times of charging the capacitor C0 per fixed time. It is possible to boost the reduced capacitor voltage VC, which in turn makes it possible to avoid an inadequacy in the step-up capability caused by a drop in the battery voltage VB or to avoid shortening the injection time-interval as in the case of a ninth embodiment.

The switch-on threshold value Ion may be changed step by step in accordance with the capacitor voltage VC. For example, the switch-on threshold value Ion is set to a first value Ion1 when the capacitor voltage VC is higher than a certain value VCth, and set to a second value Ion2 higher than the first value Ion1 when the capacitor voltage VC is not higher than a certain value VCth.

Eleventh Embodiment

Figure 21A:
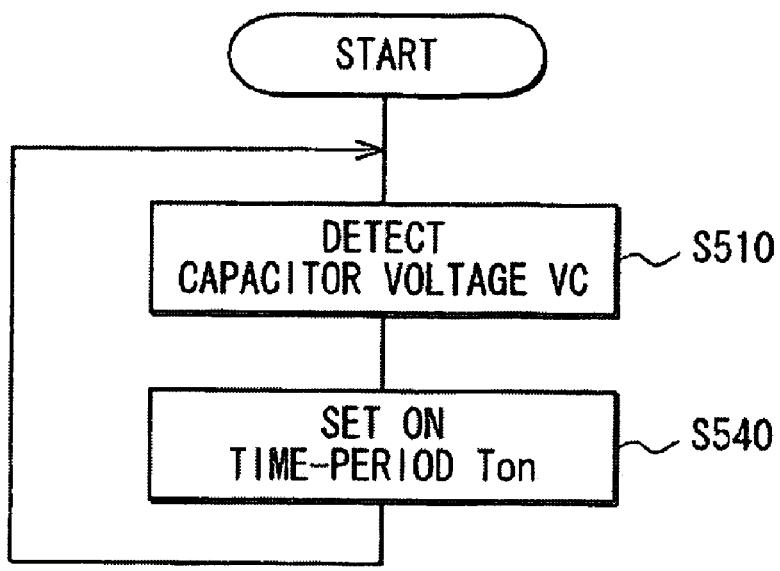
FIG. 21A is a flow chart illustrating an exemplary process of setting an ON time period capable of being carried out by a charging control circuit of an eleventh embodiment.

The fuel injection controller 100 of an eleventh embodiment differs from the fuel injection controller 100 of a third embodiment in that the charging control circuit 110 of the voltage boosting circuit 50 performs processing of setting the ON time period as shown in FIG. 21A, instead of the processing of setting the ON time period as shown in FIG. 11A.

Figure 21B:
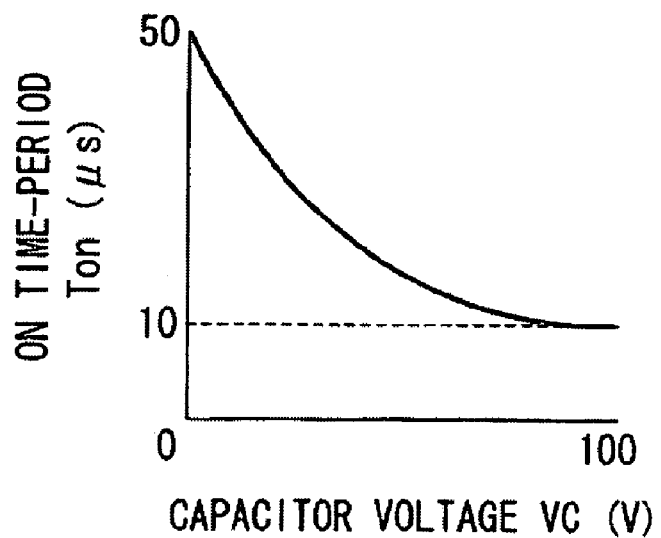
FIG. 21B is a graph illustrating an exemplary process of setting an ON time period in accordance with an eleventh embodiment.

Specifically, as shown in FIG. 21A, the charging control circuit 110 detects a capacitor voltage VC immediately before the start of the driving of the injector 101 at S510. Then, at S540, the charging control circuit 110 sets an ON time Ton for use in the voltage-boost switching control in accordance with the detected value. Specifically, as shown in FIG. 21B, the lower the detected capacitor voltage VC, the larger the value at which the ON time Ton is set, that is, the longer the ON time period is set.

In the voltage boosting circuit 50 of an eleventh embodiment, if the battery voltage VB drops or the injection time-interval is shortened, the capacitor voltage VC is reduced immediately before the start of the driving of the injector 101. In such a case, the ON time period during which the step-up switch T0 is in the ON position is set longer and the energy stored in the coil L0 when the step-up switch T0 is turned on is increased. The energy charged to the capacitor C0 by the single operation of switching the step-up switch T0 between the ON and OFF positions is thereby increased. Thus, it is possible to boost the reduced capacitor voltage VC, which in turn makes it possible to avoid an inadequacy in the step-up capability caused by a drop in the battery voltage VB or the shortening in the injection interval as in the case of the ninth and tenth embodiments.

The ON time Ton may be changed step by step in accordance with the capacitor voltage VC. For example, the ON time Ton is set to a first value Ton1 when the capacitor voltage VC is higher than a certain value VCth, and set to a second value Ton2 larger than the first value Ton1 when the capacitor voltage VC is not larger than a certain value VCth.

Twelfth Embodiment

Figure 22A:
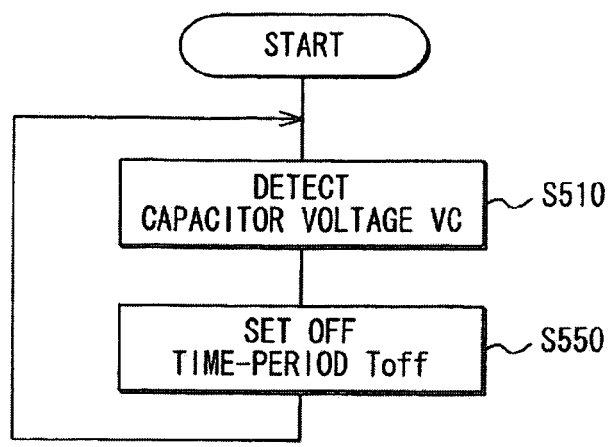
FIG. 22A is a flow chart illustrating an exemplary process of setting an OFF time period capable of being carried out by a charging control circuit of a twelfth embodiment.

The fuel injection controller 100 of a twelfth embodiment differs from the fuel injection controller 100 of a fourth embodiment in that the charging control circuit 110 of the voltage boosting circuit 50 performs processing of setting an OFF time period shown in FIG. 22A instead of the processing of setting the OFF time period shown in FIG. 13A.

Figure 22B:
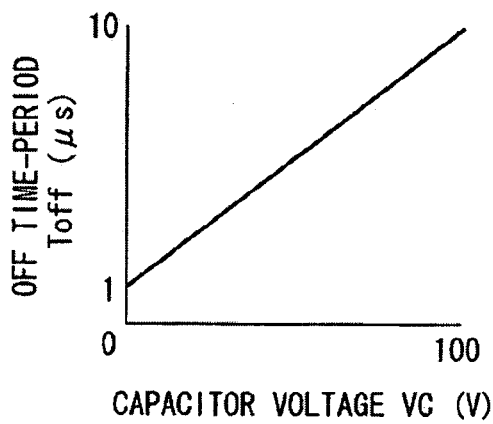
FIG. 22B is a graph illustrating an exemplary process of setting an OFF time period in accordance with a twelfth embodiment.

Specifically, as shown in FIG. 22A, the charging control circuit 110 detects a capacitor voltage VC immediately before the start of the driving of the injector 101 at S510. The charging control circuit 110 sets an OFF time Toff for use in the voltage-boost switching control in accordance; with the detected value at S550. Specifically, as shown in FIG. 22B, the lower the detected capacitor voltage VC, the smaller, or shorter, the value at which the OFF time Toff is set.

In the voltage boosting circuit 50 of a twelfth embodiment, if the battery voltage VB drops or the injection time-interval is shortened, the capacitor voltage VC is reduced immediately before the start of the driving of the injector 101. In such an event, the OFF time Toff, during which the step-up switch T0 is in the OFF position, is shorter. As a result, the number of times that the step-up switch T0 is switched between the ON and OFF positions per fixed time is increased, thus increasing the number of times of charging the capacitor C0 per fixed time. It is thereby possible to boost the reduced capacitor voltage VC, which in turn makes it possible to avoid an inadequacy in the step-up capability caused by a drop in the battery voltage VB or the shortening of the injection time-interval as in the case of the ninth, tenth and eleventh embodiments.

The OFF time Toff may be changed step by step in accordance with the capacitor voltage VC. For example, the OFF time Toff is set to a first value Toff1 when the capacitor voltage VC is higher than a certain value VCth, and set to a second value Toff2 smaller than the first value Toff1 when the capacitor voltage VC is not higher than a certain value Vth.

Thirteenth Embodiment

Figure 23:
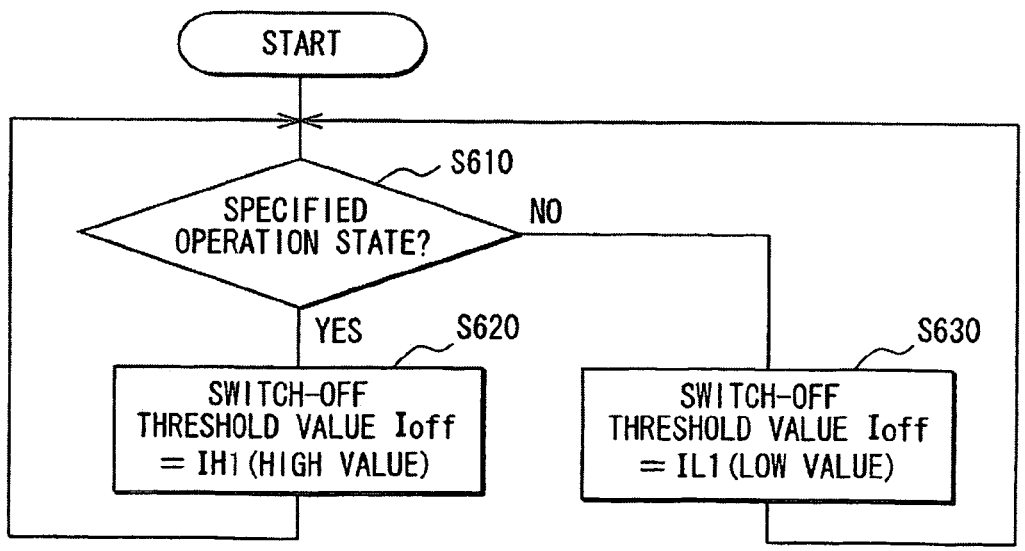
FIG. 23 is a flow chart illustrating an exemplary process of setting a switch-off threshold value capable of being carried out by a charging control circuit of a thirteenth embodiment.

The fuel injection controller 100 of a thirteenth embodiment differs from the fuel injection controller 100 of a first embodiment in that the charging control circuit 110 of the voltage boosting circuit 50 performs processing of setting a switch-off threshold value shown in FIG. 23 instead of the processing of setting the switch-off threshold value shown in FIG. 4A.

Figure 24:
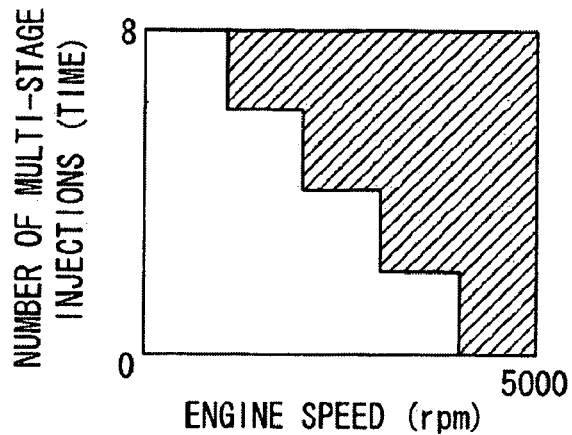
FIG. 24 is a graph illustrating a specified operational state determined by an exemplary process.

Specifically, as shown in FIG. 23, the charging control circuit 110 determines at S610 whether the engine operation state is in a specified operation state in which the number of times the capacitor C0 discharges is increased. The determination of the specified operation state at S610 is based on the engine speed and the number of multi-stage injections. The specified operation state is an operation state in which the engine speed is a certain value X or higher and the number of multi-stage injections is a certain value Y or higher as shown in the diagonally shaded area in FIG. 24. The value X of the engine speed and the value Y of the number of multi-stage injections that define the specified operation state are set such that the larger the value Y becomes, the smaller the value X becomes. Multi-stage injection refers to the operation of injecting fuel to a cylinder a plurality of times as one action of fuel injection. The number of multi-stage injections means the number of injections in the multi-stage injection. In a thirteenth embodiment, the microcomputer 130 sends a state alert signal to the charging control circuit 110 during such a specified operation state. Upon reception of the state alert signal, the charging control circuit 110 determines that the engine operation state is in the specified operation state. The same thing applies to fourteenth, fifteenth and sixteenth embodiments described in greater detail hereinafter.

When the charging control circuit 110 determines that the engine operation state is not the specified operation state, corresponding to NO at S610, the charging control circuit 110 sets the switch-off threshold value Ioff for use in the voltage-boost switching control to a predetermined value IL1 at S630. When the charging control circuit 0 determines that the engine operation state is in the specified operation state, corresponding to YES at S610, the charging control circuit 110 sets the switch-off threshold value Ioff to a value IH1 that is greater than the predetermined value IL1 at S620.

In the voltage boosting circuit 50 of a thirteenth embodiment, when the engine operation state changes to a specified operation state in which the number of times the capacitor C0 discharges is increased and, in which the number of times the fuel is injected is increased, the switch-off threshold value Ioff is set to a large value. As described earlier, when the switch-off threshold value Ioff becomes higher, the energy stored in the coil L0 when the step-up switch T0 is in the ON position is increased, resulting in an increase in the energy charged to the capacitor C0 by the single operation of switching the step-up switch T0 between the ON and OFF positions. It is thereby possible to avoid an inadequacy in the step-up capability caused by an increase in the number of times the capacitor C0 discharges.

Fourteenth Embodiment

Figure 25:
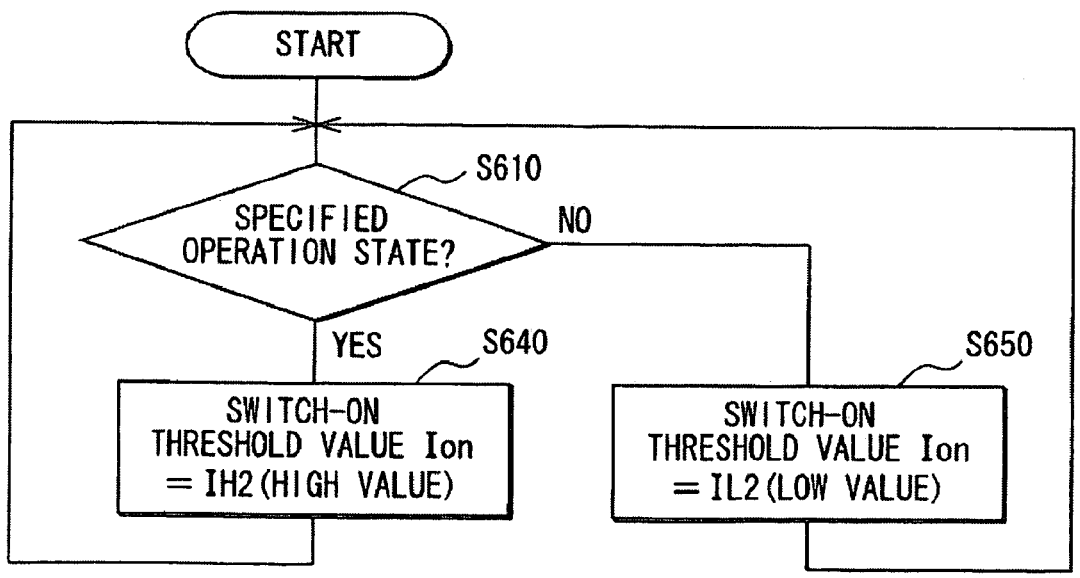
FIG. 25 is a flow chart illustrating an exemplary process of setting a switch-on threshold value capable of being carried out by a charging control circuit of a fourteenth embodiment.

The fuel injection controller 100 of a fourteenth embodiment differs from the fuel injection controller 100 of a second embodiment in that the charging control circuit 110 of the voltage boosting circuit 50 performs processing of setting a switch-on threshold value shown in FIG. 25 instead of the processing of setting the switch-on threshold value shown in FIG. 8A.

Specifically, as shown in FIG. 25, as in the case of a thirteenth embodiment, the charging control circuit 110 determines whether or not the engine operation state is in the specified operation state, at S610. Upon determining that the engine operation state is not the specified operation state, corresponding to NO at S610, the charging control circuit 110 sets the switch-on threshold value Ion for use in the voltage-boost switching control to a predetermined value IL2 at S650. Upon determining that the engine operation state is in the specified operation state, corresponding to YES at S610, the charging control circuit 110 sets the switch-on threshold value Ion to a value IH2 which is larger or higher than the predetermined value IL2 at S640.

In the voltage boosting circuit 50 of a fourteenth embodiment, when the engine operation state changes to a specified operation state in which the number of times the capacitor C0 discharges is increased, the switch-on threshold value Ion is set to a large value. As a result, the OFF time period during which the step-up switch T0 is in the OFF position is shortened. The number of times the step-up switch T0 is switched between the ON and OFF positions per fixed time is thereby increased, thus increasing the number of times of charging the capacitor C0 per fixed time. Inadequacy in the step-up capability caused by an increase in the number of times the capacitor C0 discharges, as in the case of a thirteenth embodiment, can be avoided.

Fifteenth Embodiment

Figure 26:
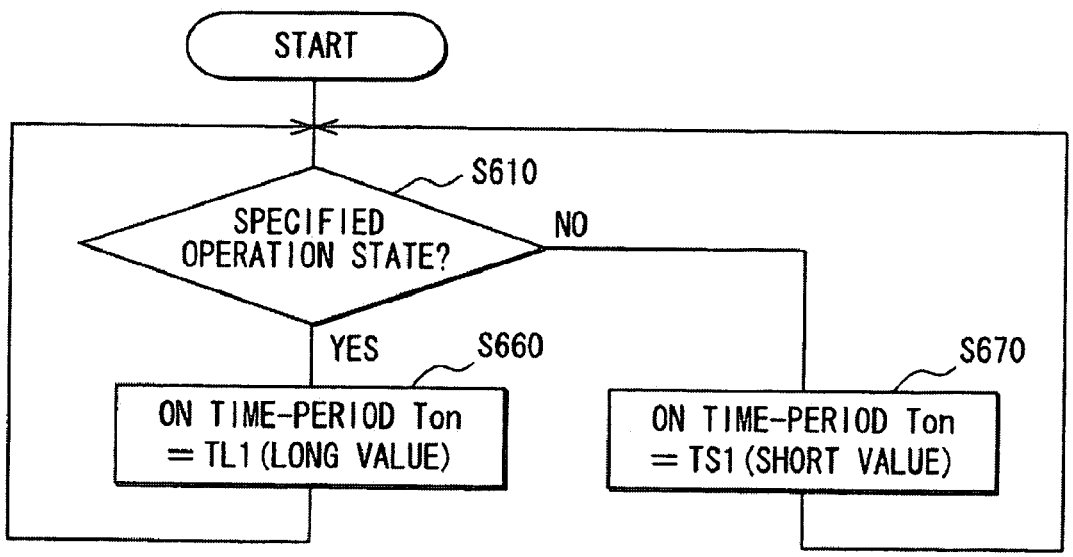
FIG. 26 is a flow chart illustrating an exemplary process of setting an ON time period capable of being carried out by a charging control circuit of a fifteenth embodiment.

The fuel injection controller 100 of a fifteenth embodiment differs from the fuel injection controller 100 of a third embodiment in that the charging control circuit 110 of the voltage boosting circuit 50 performs processing of setting an ON time period shown in FIG. 26 instead of the processing of setting the ON time period shown in FIG. 11A.

Specifically, as shown in FIG. 26, as in the case of a thirteenth embodiment, the charging control circuit 110 determines whether or not the engine operation state is in the specified operation state, at S610. Upon determining that the engine operation state is not the specified operation state, corresponding to NO at S610, the charging control circuit 110 sets the ON time Ton for use in the voltage-boost switching control to a predetermined value TS1 at S670. Upon determining that the engine operation state is in the specified operation state, corresponding to YES at S610, the charging control circuit 110 sets the ON time Ton to a value TL1 which is larger, that is, represents a longer time, than the predetermined value TS1 at S660.

In the voltage boosting circuit 50 of a fifteenth embodiment, when the engine operation state changes to a specified operation state in which the number of times the capacitor C0 discharges is increased, the ON time Ton of the step-up switch T0 is set longer. As a result, the energy stored in the coil L0 when the step-up switch T0 is in the ON position is increased, resulting in an increase in the energy charged to the capacitor C0 by the single operation of switching the step-up switch T0 between the ON and OFF positions. Thus, it is possible to avoid an inadequacy in the step-up capability caused by an increase in the number of times the capacitor C0 discharges, as in the case of the thirteenth and fourteenth embodiments.

Sixteenth Embodiment

Figure 27:
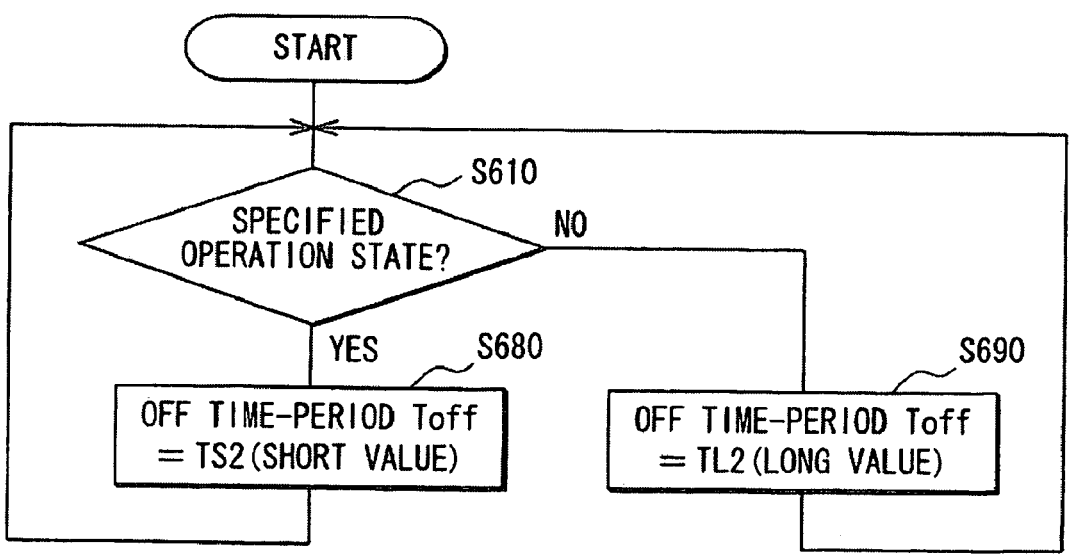
FIG. 27 is a flow chart illustrating an exemplary process of setting an OFF time period capable of being carried out by a charging control circuit of a sixteenth embodiment.

The fuel injection controller 100 of a sixteenth embodiment differs from the fuel injection controller 100 of a fourth embodiment in that the charging control circuit 110 of the voltage boosting circuit 50 performs processing of setting an OFF time period shown in FIG. 27 instead of the processing of setting the OFF time period shown in FIG. 13A.

Specifically, as shown in FIG. 27, as in the case of a thirteenth embodiment, the charging control circuit 110 determines whether or not the engine operation state is in the specified operation state at S610. Upon determining that the engine operation state is not the specified operation state, corresponding to NO at S610, the charging control circuit 110 sets the OFF time Toff for use in the voltage-boost switching control to a predetermined value TL2 at S690. Upon determining that the engine operation state is in the specified operation state, corresponding to YES at S610, the charging control circuit 110 sets the OFF time Toff to a value TS2 which is smaller, that is, represents a shorter time, than the predetermined value TL2 at S680.

In the voltage boosting circuit 50 of a sixteenth embodiment, when the engine operation state changes to a specified operation state in which the number of times the capacitor C0 discharges is increased, the OFF time Toff of the step-up switch T0 is set shorter. As a result, the number of times of switching the step-up switch T0 between the ON and OFF positions per fixed time is increased, thus increasing the number of times of charging the capacitor C0 per fixed time. It is thereby possible to avoid an inadequacy in the step-up capability caused by an increase in the number of times the capacitor C0 discharges, as in the case of the thirteenth, fourteenth and fifteenth embodiments.

While various exemplary embodiments have been described herein, the invention is not limited to these embodiments and various modes and embodiments not specifically described herein are possible and fall within the scope of the invention.

For example, in the first, fifth, ninth and thirteenth embodiments, in the voltage boost switching control shown in FIG. 2, the determination at S350 in FIG. 10 may be made in place of the determination at S150. That is, the OFF time period during which the step-up switch T0 is in the OFF position may be constant.

In the second, sixth, tenth and fourteenth embodiments, in the voltage boost switching control shown in FIG. 2, the determination at S330 in FIG. 10 may be made in place of the determination at S130. That is, the ON time period during which the step-up switch T0 is in the ON position may be constant.

In the third, seventh, eleventh and fifteenth embodiments, in the voltage boost switching control in FIG. 10, the determination at S150 in FIG. 2 may be made in place of the determination at S350. That is, the step-up switch T0 may be switched from OFF to ON as a result of the monitoring of the current flowing through the resistor R0.

In the fourth, eighth, twelfth and sixteenth embodiments, in the voltage boost switching control in FIG. 10, the determination at S130 in FIG. 2 may be made in place of the determination at S330. That is, the step-up switch T0 may be switched from ON to OFF as a result of the monitoring of the current flowing through the resistor R0.

In the thirteenth to sixteenth embodiments, the specified operation state is not limited to the foregoing. For example, the specified operation state may be defined by the engine speed alone, such as when the engine speed is a certain value or higher. Conversely, the specified operation state may be defined by the number of multi-stage injections alone, such as when the number of multi-stage injections is a certain value or higher.

The injector is not limited to the solenoid type, but may be of a type provided with a piezoactuator extending to open the valve. Further, a driven actuator may be any other type besides the actuator for opening the injector.

What is claimed is:

1. A power supply voltage booster comprising:
a coil including one end supplied with a power supply voltage;
a switching device including two output terminals connected in series to a path between an other end of the coil and a reference electrical potential lower than the power supply voltage;
a diode including an anode connected to a current path that connects the other end of the coil and a one of the output terminals of the switching device, the one located closer to the coil;
a capacitor having a first terminal and a second terminal, the capacitor connected in series to a path between cathode of the diode and the reference electrical potential; and
a controller configured to perform a voltage-boost switching control for repeatedly switching the switching device between an ON position and an OFF position to produce a counter-electromotive force in the coil according to a control condition, and charges the capacitor with the counter-electromotive force so that a voltage higher than the power supply voltage is produced in the first terminal of the capacitor, the first terminal being farther away from the reference electric potential than the second terminal, wherein
the controller changes the control condition for the voltage-boost switching control to increase an amount of the counter-electromotive force applied per fixed time to charge the capacitor when the power supply voltage becomes low;
during the voltage-boost switching control, the controller detects a charging current flowing into the capacitor from the coil when the switching device is in the OFF position, and turns the switching device from the OFF position to the ON position when the controller determines that the current decreases to a switch-on threshold value, and
the controller changes the switch-on threshold value, as the control condition, in accordance with the power supply voltage to increase the switch-on threshold value when the power supply voltage becomes low.

2. A power supply voltage booster, comprising:
a coil including one end supplied with a power supply voltage;
a switching device including two output terminals connected in series to a path between an other end of the coil and a reference electrical potential lower than the power supply voltage;
a diode including an anode connected to a current path making a connection between the other end of the coil and a one of the output terminals of the switching device, the one located closer to the coil;
a capacitor having a first terminal and a second terminal, the capacitor connected in series to a path between a cathode of the diode and the reference electrical potential; and
a controller is configured to perform a voltage-boost switching control for repeatedly switching the switching device between an ON position and an OFF position to produce a counter-electromotive force in the coil, and charges the capacitor with the counter-electromotive force so that a voltage higher than the power supply voltage is produced at the first terminal of the capacitor, the terminal being farther away from the reference electric potential than the second terminal, wherein:
when an actuator driving time occurs, electric charge accumulated in the capacitor is discharged to the actuator as an actuator driving power,
the controller detects an internal between occurrences of the actuator driving time, and changes a control condition for the voltage-boost switching control to increase the amount of energy applied per fixed time to charge the capacitor when the driving time interval becomes shorter,
during the voltage-boost switching control, the controller detects a charging current flowing into the capacitor from the coil when the switching device is in the OFF position, and turns the switching device from the OFF position to the ON position when the controller determines that the current decreases to cross a switch-on threshold value, and
the controller changes the switch-on threshold value, as the control condition, in accordance with the driving time interval to increase the switch-on threshold value when the driving time interval becomes shorter.

3. A power supply voltage booster, comprising:
a coil including one end supplied with a power supply voltage;
a switching device including two output terminals connected in series to a path between the other end of the coil and a reference electrical potential lower than the power supply voltage;
a diode including an anode connected to a current path making a connection between the other end of the coil and a one of the output terminals of the switching device, the one located closer to the coil;
a capacitor having a first terminal and a second terminal, the capacitor connected in series to a path between a cathode of the diode and the reference electrical potential; and
a controller configured to perform a voltage-boost switching control for repeatedly switching the switching device between an ON position and an OFF position to produce a counter-electromotive force in the coil, and charges the capacitor with the counter-electromotive force so that a voltage higher than the power supply voltage is produced at the first terminal of the capacitor, the terminal being farther away from the reference electric potential than the second terminal, wherein:
when an actuator driving time occurs, electric charge accumulated in the capacitor is discharged to the actuator as an actuator driving power,
the controller detects a charging voltage of the capacitor immediately before the start of the driving of the actuator, which is a pre-drive charging voltage, and changes a control condition for the voltage-boost switching control to increase the amount of energy applied per fixed time to charge the capacitor when the pre-drive charging voltage becomes low,
during the voltage-boost switching control, the controller detects a charging current flowing into the capacitor from the coil when the switching device is in the OFF position, and turns the switching device from the OFF position to the ON position when the controller determines that the current decreases to cross a switch-on threshold value, and
the controller changes the switch-on threshold value, as the control condition, in accordance with the pre-drive charging voltage to increase the switch-on threshold value when the pre-drive charging voltage becomes lower.

4. A power supply voltage booster, comprising:
coil including one end supplied with a power supply voltage;
a switching device including two output terminals connected in series to a path between the other end of the coil and a reference electrical potential lower than the power supply voltage;
a diode including an anode connected to a current path making a connection between the other end of the coil and a one of the output terminals of the switching device, the one located closer to the coil;
a capacitor having a first terminal and a second terminal, the capacitor connected in series to a path between a cathode of the diode and the reference electrical potential; and
a controller configured to perform a voltage-boost switching control for repeatedly switching the switching device between an ON position and an OFF position to produce a counter-electromotive force in the coil, and charges the capacitor with the counter-electromotive force so that a voltage higher than the power supply voltage is produced at a first terminal of the capacitor, the first terminal farther away from the reference electric potential than the second terminal, wherein:
when a timing of injecting fuel to an internal combustion engine occurs, electric charge accumulated in the capacitor is discharged as an actuator driving power to an actuator for opening a fuel injection valve,
the controller determines whether an operation state of the internal combustion engine is in a specified operation state in which the number of times the capacitor discharges is increased, and, when the controller determines that the operation state is in the specified operation state, the controller changes a control condition for the voltage-boost switching control to increase the amount of energy applied per fixed time to charge capacitor to a higher level than when the operation state is not the specified operation state,
during the voltage-boost switching control, the controller detects a charging current flowing into the capacitor from the coil when the switching device is in the OFF position, and turns the switching device from the OFF position to the ON position when the controller determines that the current decreases to a switch-on threshold value, and the controller changes the switch-on threshold value, as the control condition, to a larger value when the operation state is determined as the specified operation state than when the operation state is not determined as the specified operation state.

5. The power supply voltage booster according to claim 1, wherein the switch-on threshold value is change so that a voltage applied to the capacitor per a fixed period of time becomes a target charge voltage.

6. The power supply voltage booster according to claim 2, wherein the switch-on threshold value is change so that a voltage applied to the capacitor per a fixed period of time becomes a target charge voltage.

7. The power supply voltage booster according to claim 3, wherein the switch-on threshold value is change so that a voltage applied to the capacitor per a fixed period of time becomes a target charge voltage.

8. The power supply voltage booster according to claim 4, wherein the switch-on threshold value is change so that a voltage applied to the capacitor per a fixed period of time becomes a target charge voltage.

* * * * *